(12) United States Patent
Choi et al.

(10) Patent No.: US 10,050,268 B2
(45) Date of Patent: Aug. 14, 2018

(54) COMPOSITE POSITIVE ACTIVE MATERIAL, POSITIVE ELECTRODE AND LITHIUM BATTERY CONTAINING THE COMPOSITE POSITIVE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Byungjin Choi, Seoul (KR); Andrei Kapylou, Yongin-si (KR); Donghan Kim, Suwon-si (KR); Jinhwan Park, Seoul (KR); Jayhyok Song, Yongin-si (KR); Sungjin Ahn, Anyang-si (KR); Donghee Yeon, Seoul (KR); Byongyong Yu, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 59 days.

(21) Appl. No.: 15/244,701

(22) Filed: Aug. 23, 2016

(65) Prior Publication Data
US 2017/0062813 A1    Mar. 2, 2017

(30) Foreign Application Priority Data
Aug. 25, 2015 (KR) ........................ 10-2015-0119824

(51) Int. Cl.
*H01M 4/36* (2006.01)
*H01M 4/525* (2010.01)
*H01M 4/505* (2010.01)
*H01M 10/0525* (2010.01)

(52) U.S. Cl.
CPC .......... *H01M 4/525* (2013.01); *H01M 4/364* (2013.01); *H01M 4/505* (2013.01); *H01M 10/0525* (2013.01)

(58) Field of Classification Search
CPC ...... H01M 4/525; H01M 4/364; H01M 4/505; H01M 10/0525
See application file for complete search history.

(56) References Cited

U.S. PATENT DOCUMENTS

| | | | |
|---|---|---|---|
| 2014/0127398 A1 | 5/2014 | Thakeray et al. | |
| 2015/0037680 A1 | 2/2015 | Park et al. | |
| 2015/0079465 A1 | 3/2015 | Choi et al. | |
| 2015/0118574 A1* | 4/2015 | Visbal ................. | H01M 10/052 429/322 |
| 2016/0020458 A1 | 1/2016 | Choi et al. | |
| 2016/0156021 A1* | 6/2016 | Aihara ................. | H01M 4/131 429/304 |

(Continued)

FOREIGN PATENT DOCUMENTS

| | | |
|---|---|---|
| JP | 2011181235 A | 9/2011 |
| JP | 5526017 B2 | 4/2014 |

(Continued)

*Primary Examiner* — Stewart A Fraser
(74) *Attorney, Agent, or Firm* — Cantor Colburn LLP

(57) ABSTRACT

A composite positive active material includes a composite, the composite including: a first metal oxide having a layered crystal structure; and a second metal oxide having a rocksalt crystal structure, wherein the composite includes at least one doping element selected from Group 1 and Group 2 of the Periodic Table wherein the doping element is not Li.

21 Claims, 20 Drawing Sheets

(56) References Cited

U.S. PATENT DOCUMENTS

2016/0190550 A1 6/2016 Choi et al.
2016/0190557 A1 6/2016 Kim et al.
2017/0179470 A1* 6/2017 Choi .................. H01M 4/0471
2017/0338473 A1* 11/2017 Cho ..................... H01M 4/366

FOREIGN PATENT DOCUMENTS

KR 10-1470090 B1 12/2014
KR 1020150017012 A 2/2015

* cited by examiner

COMPOSITE POSITIVE ACTIVE MATERIAL, POSITIVE ELECTRODE AND LITHIUM BATTERY CONTAINING THE COMPOSITE POSITIVE ACTIVE MATERIAL

CROSS-REFERENCE TO RELATED APPLICATION

This application claims priority to and the benefit of Korean Patent Application No. 10-2015-0119824, filed on Aug. 25, 2015 in the Korean Intellectual Property Office, and all the benefits accruing therefrom under 35 U.S.C. § 119, the content of which is incorporated herein in its entirety by reference.

BACKGROUND

1. Field

The present disclosure relates to a composite positive active material and a positive electrode and a lithium battery that include the composite positive active material.

2. Description of the Related Art

Lithium batteries have been used as a power source for vehicles as well as for portable electronic devices, and efforts have been made to improve their capacity. As various devices have become more complex and perform multiple functions, the demand to increase the voltage of a lithium battery, which acts as an energy source of the device, has increased, as well as the demand to reduce a size and a weight of the lithium battery. Thus there remains a need for an improved battery material.

SUMMARY

Provided is a composite positive active material for a lithium battery that is structurally stable while charging and discharging.

Provided is a positive electrode including the composite positive active material.

Provided is a lithium battery including the positive electrode.

Additional aspects will be set forth in part in the description which follows and, in part, will be apparent from the description, or may be learned by practice of the presented exemplary embodiments.

According to an aspect, a composite positive active material includes a composite, the composite including: a first metal oxide having a layered crystal structure; and a second metal oxide having a rocksalt crystal structure, wherein the composite includes at least one doping element selected from Group 1 and Group 2 of the Periodic Table wherein the doping element is not Li.

According to another aspect, a positive electrode includes the composite positive active material.

According to another aspect, a lithium battery includes the positive electrode.

According to yet another aspect, a method of preparing a composite positive active material includes: preparing a solution including a first metal oxide precursor; precipitating the first metal oxide precursor to obtain a first metal hydroxide; mixing the first metal hydroxide, a lithium precursor, a second metal oxide precursor, and a doping element precursor to form a mixture; and heat-treating the mixture to prepare the composite positive active material.

According to another embodiment, a method of preparing a positive electrode includes, mixing a composite positive active material, a conductive agent, a binder, and a solvent to prepare a positive active material composition; and coating the positive active material composition on a current collector, wherein the positive active material includes a composite including a first metal oxide having a layered crystal structure, and a second metal oxide having a rocksalt crystal structure, wherein the composite comprises at least one doping element selected from Group 1 and Group 2 of the Periodic Table wherein the doping element is not Li.

BRIEF DESCRIPTION OF THE DRAWINGS

These and/or other aspects will become apparent and more readily appreciated from the following description of the exemplary embodiments, taken in conjunction with the accompanying drawings in which:

FIGS. 3A, 3B, and 3C are graphs of intensity (arbitrary units, a.u.) versus scattering angle (degrees two-theta, 2θ) showing the results of X-ray diffraction (XRD) analysis of the composite positive active materials prepared in Comparative Examples 1 to 5 in which FIGS. 3B and 3C are expanded views of FIG. 3A;

FIGS. 4A, 4B, and 4C are graphs of intensity (arbitrary units, a.u.) versus scattering angle (degrees two-theta, 2θ) showing the results of XRD analysis of composite positive active material powders prepared in Comparative Examples 1 and 3 and Manufacture Examples 1 to 4 in which FIGS. 4B and 4C are expanded views of FIG. 4A;

DETAILED DESCRIPTION

Figure 1:
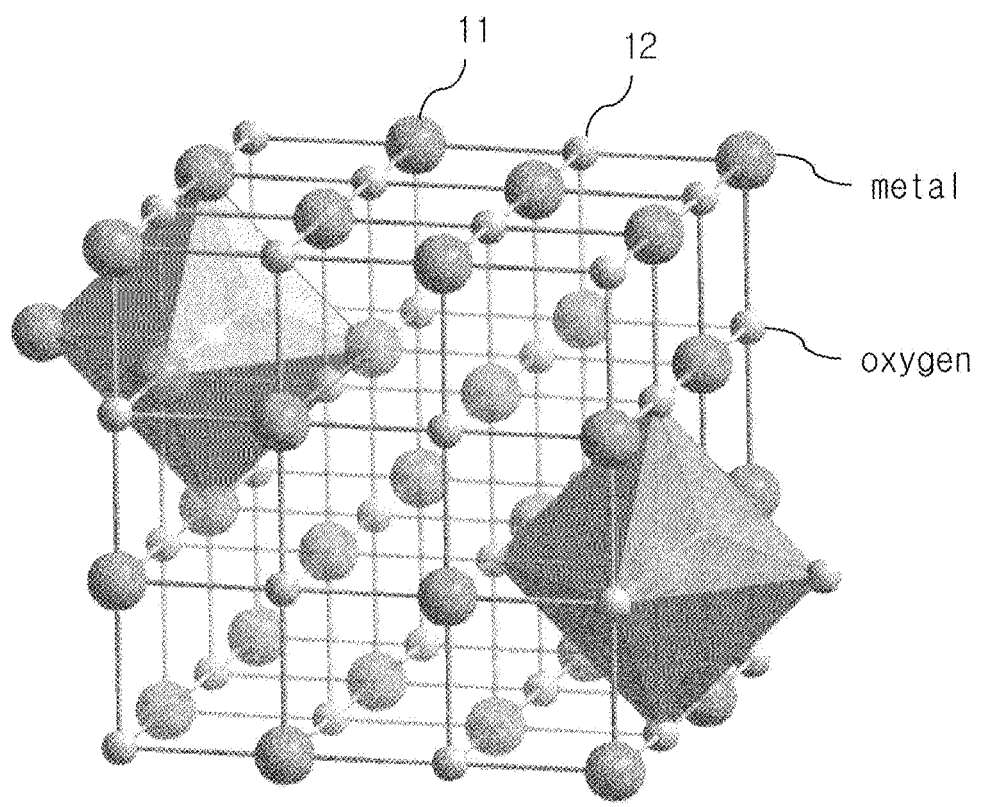
FIG. 1 is a schematic image of a rocksalt crystal structure of a composite positive active material according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to an exemplary embodiment, a composite positive active material, a method of preparing the composite positive active material, a positive electrode including the composite positive active material, and a lithium battery including the positive electrode are disclosed in further detail.

In an exemplary embodiment, a composite positive active comprises a composite, and the composite comprises a first metal oxide having a layered crystal structure, and a second metal oxide having a rocksalt crystal structure, wherein the composite further comprises at least one doping element selected from Group 1 and Group 2 of the Periodic Table, wherein the doping element is not Li.

A lithium transition metal oxide (e.g., of the formula $LiMeO_2$, where Me is at least one metal) having a layered structure forms an ion-binding crystal structure, and thus has a compact crystalline structure. Oxygen ions, which have the largest ionic diameter of elements of the lithium transition metal oxide, form a compact layer, and lithium ions and transition metal ions fill the empty space between the oxygen ions, thereby increasing a packing density of the compact crystalline structure of the lithium transition metal oxide. In the lithium transition metal oxide, a transition metal oxide layer, which includes a transition metal and oxygen (e.g., of the formula $MeO_2$), and an oxygen octahedral layer, which surrounds lithium ions, are arranged alternately. Since a strong ionic bond is formed within the transition metal oxide layer and because coulombic repulsive forces are present between the transition metal oxide layers, lithium ions may be intercalated and deintercalated from the lithium transition metal oxide. Furthermore, since the lithium ions may diffuse along a two-dimensional plane of the structure of the lithium transition metal oxide, an ion conductivity of the lithium transition metal oxide is high.

However, due to the deintercalation of lithium during charging and discharging, oxygen atoms in the $MeO_2$ layer are repulsed by each other. While not wanting to be bound by theory, it is understood that such repulsive forces causes expansion of a crystal structure of the lithium transition metal oxide in a c-axis direction. Alternatively, the crystal structure may rapidly contract or collapse in a c-axis direction upon the complete deintercalation of lithium, and various changes in the phase may result.

When a portion of a transition metal site in the lithium transition metal oxide having a layered structure is substituted with lithium, a lithium transition metal oxide having a layer-layer composite structure, e.g., a lithium transition metal oxide of the formula ($Li_2MO_3 \cdot LiMeO_2$), including excess lithium, can be obtained. A lithium transition metal oxide having such a layer-layer structure may have an improved capacity of about 200 milliampere-hours per gram (mAh/g) or greater.

For example, in an embodiment in which the transition metal is Mn, the lithium transition metal oxide having a composite structure forms a structure of the Formula $uLi_2MnO_3 \cdot (1-u)MO_2$ (wherein $0<u<1$) by deintercalatation of lithium from $LiMnO_2$ during initial charging up to a voltage of 4.4 volts (V), and forms a structure of the formula $(u-\delta)Li_2MnO_3 \cdot \delta MnO_2 \cdot (1-u)MO_2$ (wherein $0<u<1$, $0<\delta<1$, and u+δ=1) with Li$_2$O at a voltage of about 4.4 V or greater. That is, as shown in Reaction Scheme 1, when charged to a voltage of about 4.4 V or greater, Li$_2$O is formed by generation of oxygen and deintercalation of lithium from Li$_2$MnO$_3$ at the same time, and a reaction producing MnO$_2$ proceeds. As shown in Reaction Scheme 2, Li$_2$O does not participate in the reaction during discharging, and thus Li$_2$MnO$_3$ may not be recovered.

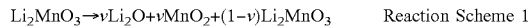

Reaction Scheme 1

Reaction Scheme 2

In Reaction Scheme 1, 0<v<1.

That is, when a cut-off voltage during charging is increased to about 4.4 V or greater, Li$_2$MnO$_3$ is decomposed to form Li$_2$MnO$_3$, and the Li$_2$MnO$_3$ is not recovered during discharge, and thus a remaining amount of Li$_2$MnO$_3$ in the composite positive active material decreases. Accordingly, due to the decrease in the remaining amount of Li$_2$MnO$_3$, which, while not wanting to be bound by theory, is understood to stabilize a structure of the lithium transition metal oxide when a cut-off voltage is increased, a structural stability of the layer-layer composite positive active material decreases, and thus consequently, a charging/discharging voltage may decrease. Also, in the initial charging/discharging reaction, 2 mole equivalents (eq.) of lithium with respect to 1 mole eq. of manganese are deintercalated during charging, and only 1 mole eq. of lithium is intercalated during discharging. Thus, a charging/discharging efficiency may decrease, and lifespan characteristics may be deteriorated.

On the other hand, to suppress the phase transition of the first metal oxide having the layered crystal structure during the charging/discharging process, a second metal oxide having a rocksalt crystal structure may be introduced as a new phase to the composite positive active material, such that the second metal oxide and the first metal oxide may form a composite. In addition, the composite may be doped with at least one element selected from Group 1 and Group 2 of the Periodic Table, so as to further improve stability, thus improving lifespan characteristics and voltage characteristics.

As shown in FIG. 1, the rocksalt crystal structure has a face-centered cubic structure in which metal atoms 11 are each coordinated by 6 oxygen atoms 12 in an octahedral form around each metal atom. The second metal oxide including the rocksalt crystal structure may then have an improved structural stability and improved lithium ion conductivity, and may have a crystal structure which is similar to the layered crystal structure.

Thus, by including the second metal oxide having the rocksalt crystal structure, the structural stability of the first metal oxide having a layered crystal structure may be improved while not adversely affecting the conductivity of lithium ions in the composite positive active material. That is, the second metal oxide may act as a stabilizer phase in the composite positive active material. Accordingly, the lifespan characteristics and voltage characteristics of the composite positive active may be improved.

The second metal oxide may include at least one metal element selected from Group 8, Group 9, Group 10, Group 11, and Group 12 of the Periodic Table. For example, the metal element may include at least one metal selected from nickel (Ni), cobalt (Co), manganese (Mn), iron (Fe), copper (Cu), and chromium (Cr).

For example, the second metal oxide in the composite positive active material may have a composition represented by Formula 1.

AO      Formula 1

In Formula 1, A may include at least one metal selected from Ni, Co, Fe, Cu, zinc (Zn), calcium (Ca), strontinum (Sr), magnesium (Mg), and Cr.

In the composite positive active material, the first metal oxide having a layered crystal structure and the second metal oxide having a rocksalt crystal structure form a composite. The composite is different from a mere physical mixture, and a crystalline phase having a layered crystal structure and a crystalline phase having a rocksalt crystal structure are chemically bound in the composite.

In addition, the composite may have a configuration in which the second metal oxide is intermixed within the layered crystal structure of the first metal oxide. That is, a crystalline phase including the rocksalt crystal structure of the second metal oxide may be intermixed in the crystalline phase including the layered crystal structure of the first metal oxide. Thus, the crystalline phase having the layered crystal structure and the crystalline phase having the rocksalt structure may be homogenously distributed in the composite. Accordingly, the configuration of the composite may be different from a configuration including a physical mixture of particles the first metal oxide and particles of the second metal oxide, or a composition in which the first metal oxide coated with the second metal oxide, or a configuration including the second metal oxide coated with the first metal oxide.

In addition, the composite positive active material may include at least one doping element selected from elements, other than lithium, belonging to Group 1 and Group 2 of the Periodic Table. For example, the doping element may include at least one metal selected from sodium (Na), potassium (K), Ca, and barium (Ba).

The doping element may be used to dope the first metal oxide having the layered crystal structure in the composite positive active material. The doping element may be used to dope the Li ion layer of the first metal oxide. Accordingly, due to the presence of the doping element, the structural stability of the first metal oxide may be maintained even if lithium is deintercalated. In this regard, an electrical conductivity and/or an ionic conductivity of the first metal oxide may be further improved.

As the first metal oxide having the layered crystal structure in the composite positive active material, any suitable metal oxide that has a layered crystal structure and is capable of intercalating/deintercalating lithium ions may be used.

The first metal oxide may be formed of a single phase or a plurality of crystalline phases having at least two different compositions from one another. When the first metal is formed of a plurality of crystalline phases having at least two different compositions from one another, the plurality of crystalline phases may form a composite phase. Here, the composite phase may be in a composite form and have a chemical bond (e.g. an ionic bond) between the phases, instead of a simple mixture of the plurality of crystalline phases which may not have the chemical bond between the phases. The crystalline phases having different compositions from one another in the composite phase may be homogeneously distributed.

The first metal oxide doped with the doping element may include, for example, at least one composition represented by one of Formulae 2 and 3.

$[Li_{1-a}A'_a]MeO_2$      Formula 2

In Formula 2, A' may include at least one element selected from Group 1 and Group 2 of the Periodic Table, Me may include at least one metal selected from Mn, vanadium (V), Cr, Fe, Co, Ni, Zr, rhenium (Re), aluminum (Al), boron (B), germanium (Ge), ruthenium (Ru), tin (Sn), titanium (Ti), niobium (Nb), molybdenum (Mo), and platinum (Pt), and 0<a≤0.2, and where the element is not Li.

$$v[Li_{2-b}A'_b][M_{1-c}A'_c]O_3 \cdot w[Li_{1-d}A'_d][Me_{1-e}A'_e]O_2 \quad \text{Formula 3}$$

In Formula 3, A' may include at least one element selected from Group 1 and Group 2 of the Periodic Table, M may include at least one metal selected from Al, gallium (Ga), Ge, Mg, Nb, Zn, cadmium (Cd), Ti, Co, Ni, K, Na, Ca, silicon (Si), Fe, Cu, Sn, vanadium (V), B, phosphorus (P), selenium (Se), bismuth (Bi), arsenic (As), zirconium (Zr), Re, Ru, Mn, Cr, Sr, scandium (Sc), yttrium (Y), and a rare earth metal; Me may include at least one metal selected from Mn, V, Cr, Fe, Co, Ni, Zr, Re, Al, B, Ge, Ru, Sn, Ti, Nb, Mo, and Pt, 0<v<1, 0<w<1, v+w=1, 0≤b<1, 0≤c<1, 0≤e<1, and 0<A'/Li≤0.2, wherein A'/Li refers to a molar ratio of A' and Li in the composite positive active material.

In Formula 2, A' may include, for example, at least one element selected from Na, K, Ca, and Ba. In Formula 2, a may be 0<a≤0.2, e.g., 0<a≤0.12, 0<a≤0.1, or 0<a≤0.08.

For example, the composition represented by Formula 2 may be represented by Formula 2a.

$$[Li_{1-a}A'_a](Ni_pCo_qMn_r)O_2 \quad \text{Formula 2a}$$

In Formula 2a, A' may comprise at least one element selected from Na, K, Ca, and Ba; 0≤p≤1, 0≤q≤1, 0≤r≤1, p+q+r=1, and 0<a≤0.2.

In Formula 3, A' may include, for example, at least one element selected from Na, K, Ca, and Ba. For example, in Formula 3, a, b, c, d, and e may satisfy 0≤b≤0.2, 0≤c≤0.2, 0≤d≤0.2, and 0≤e≤0.2, and may be A'/Li is such that 0≤A'/Li≤0.2.

For example, the composition represented by Formula 3 may be represented by Formula 3a.

$$v[Li_{2-b}A'_b]_2MO_3 \cdot w[Li_{1-d}A'_d]MeO_2 \quad \text{Formula 3a}$$

In Formula 3a, A' may comprise at least one element selected from Group 1 and Group 2 of the Periodic Table and is not Li; Me may comprise at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth element, Me may comprise at least one metal selected from Mn, V, Cr, Fe, Co, Ni, Zr, Re, Al, B, Ge, Ru, Sn, Ti, Nb, and Mo; 0<v<1, 0<w<1, v+w=1, 0≤b<1, 0≤d<1, and 0<A'/Li≤0.2, wherein A'/Li refers to a molar ratio of A' and Li in the composite positive active material.

For example, the composition represented by Formula 3 may be represented by Formula 3b.

$$v[Li_{2-b}A'_d]_2MnO_3 \cdot w[Li_{1-d}A'_d](Ni_pCo_qMn_r)O_2 \quad \text{Formula 3b}$$

In Formula 3b, A' may include at least one element selected from Na, K, Ca, and Ba, 0<v<1, 0<w<1, v+w=1, 0≤p≤1, 0≤q≤1, 0≤r≤1, p+q+r=1, 0≤b<1, 0≤d<1, and 0<A'/Li≤0.2, wherein A'/Li refers a molar ratio of A' and Li in the composite positive active material.

The first metal oxide may include at least one composition represented by at least one of Formulae 2 to 3b.

Thus, the composite positive active material, which comprises a composite of the first metal oxide and the second metal oxide, may comprise at least one composition represented by Formulae 4 and 5.

$$x[Li_{1-a}A'_a]MeO_2 \cdot yAO \quad \text{Formula 4}$$

In Formula 4, A' may comprise at least one element selected from Group 1 and Group 2 of the Periodic Table and is not Li, Me may comprise at least one metal selected from Mn, V, Cr, Fe, Co, Ni, Zr, Re, Al, B, Ge, Ru, Sn, Ti, Nb, Mo, and Pt, A may comprise at least one metal selected from Ni, Co, Fe, Cu, Zn, Ca, Sr, Mg, and Cr, 0<x<1, 0<y<0.2, x+y=1, and 0<a≤0.2.

$$x[Li_{2-b}A'_b][M_{1-c}A'_c]O_3 \cdot y[Li_{1-d}A'_d][Me_{1-e}A'_e]O_2 \cdot zAO \quad \text{Formula 5}$$

In Formula 5, A' may comprise at least one element selected from Group 1 and Group 2 of the Periodic Table, M may comprise at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth element, Me may comprise at least one metal selected from Mn, V, Cr, Fe, Co, Ni, Zr, Re, Al, B, Ge, Ru, Sn, Ti, Nb, Mo, and Pt, A may comprise at least one metal selected from Ni, Co, Fe, Cu, Zn, Ca, Sr, Mg, and Cr, 0<x<1, 0<y<1, 0<z<0.2, x+y+z=1, 0≤b<1, 0≤c<1, 0≤d<1, 0≤e<1, and 0<A'/Li≤0.2, wherein A'/Li refers to a molar ratio of A' and Li in the composite positive active material.

For example, the composition represented by Formula 4 may be represented by Formula 4a.

$$x[Li_{1-a}A'_a](Ni_pCo_qMn_r)O_2 \cdot yAO \quad \text{Formula 4a}$$

In Formula 4a, A' may comprise at least one element selected from Na, K, Ca, and Ba, 0<x<1, 0<y<0.2, x+y=1, 0<a≤0.2, 0≤p≤1, 0≤q≤1, 0≤r≤1, and p+q+r=1.

For example, the composition represented by Formula 5 may be represented by Formula 5a.

$$x[Li_{2-b}A'_b]_2MO_3 \cdot y[Li_{1-d}A'_d]MeO_2 \cdot zAO \quad \text{Formula 5a}$$

In Formula 5a, A' may comprise at least one element selected from Group 1 and Group 2 of the Periodic Table and is not Li, M may comprise at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth element, Me may comprise at least one metal selected from Mn, V, Cr, Fe, Co, Ni, Zr, Re, Al, B, Ge, Ru, Sn, Ti, Nb, Mo, and Pt, A may comprise at least one metal selected from Ni, Co, Fe, Cu, Zn, Ca, Sr, Mg, and Cr, 0<x<1, 0<y<1, 0<z<0.2, x+y+z=1, 0≤b<1, 0≤d<1, and 0<A'/Li≤0.2, wherein A'/Li refers to a molar ratio of A' and Li in the composite positive active material.

For example, the composition represented by Formula 5 may be represented by Formula 5b.

$$x[Li_{2-b}A'_b]_2MnO_3 \cdot y[Li_{1-d}A'_d](Ni_pCo_qMn_r)O_2 \cdot zAO \quad \text{Formula 5b}$$

In Formula 5b, A' may comprise at least one element selected from Na, K, Ca, and Ba, A may comprise at least one metal selected from Ni, Co, Fe, Cu, Zn, Ca, Sr, Mg, and Cr; 0<x<1, 0<y<1, 0<z<0.2, x+y+z=1, 0≤p≤1, 0≤q≤1, 0≤r≤1, p+q+r=1, 0≤b<1, 0≤d<1, and 0<A'/Li≤0.2, wherein A'/Li refers to a molar ratio of A' and Li in the composite positive active material.

For example, the composition represented by Formula 5 may be represented by Formula 5c.

$$x[Li_{2-b}Na_b]_2MnO_3 \cdot y[Li_{1-d}Na_d](Ni_pCo_qMn_r)O_2 \cdot zNiO \quad \text{Formula 5c}$$

In Formula 5c, 0<x<1, 0<y<1, 0<z<0.2, x+y+z=1, 0≤p≤1, 0≤q≤1, 0≤r≤1, p+q+r=1, 0≤b<1, 0≤d<1, and 0<A'/Li≤0.2, wherein A'/Li refers to a molar ratio of A' and Li in the composite positive active material.

Although the composite positive active material comprises, e.g., is doped with, the doping element, the crystalline phase of each of the first metal oxide and the second metal oxide may be maintained, and impurities are not formed therein.

When the composite positive active material is doped with the doping element, the lifespan characteristics of the composite positive active material are further improved and the voltage drop is suppressed.

In another exemplary embodiment, a positive electrode may include the positive active material. The positive electrode may be prepared by molding a composition for forming the positive active material into a predetermined shape, the composition including the composite positive active material and a binder. Alternatively, the positive electrode may be prepared by coating a current collector, such as an Al thin film, with a composition for forming the positive active material.

In detail, a composition for forming the positive active material may be prepared by mixing the composite positive active material, a conducting agent, a binder, and a solvent. A positive electrode plate may be prepared by directly coating a metal current collector with the composition for forming the positive active material. Alternatively, the composition for forming the positive active material may be cast on a separate support, and then a metal current collector may be laminated with a film detached from the support to prepare a positive electrode plate. The positive electrode is not limited to the configurations described above, and may have other configurations.

In some exemplary embodiments, the positive electrode may further include an additional positive active material, such as one known in the art, which has at least one technical feature, such as a composition or a physical property, which differs from that of the composite positive active material.

The additional positive active material may be a lithium-containing metal oxide which may be any suitable positive active material, including those available in the art. For example, at least one type of a composite oxide of lithium and at least one metal selected from Co, Mn, and Ni may be used. Examples of the composite oxide may include a compound represented by at least one of the following chemical formulae: $Li_aA_{1-b}B'_bD_2$ (where $0.90 \leq a \leq 1.1$ and $0 \leq b \leq 0.5$); $Li_aE_{1-b}B'_bO_{2-c}D_c$ (where, $0.90 \leq a \leq 1.1$, $0 \leq b \leq 0.5$, and $0 \leq c \leq 0.05$); $LiE_{2-b}B'_bO_{4-c}D_c$ (where, $0 \leq b \leq 0.5$ and $0 \leq c \leq 0.05$); $Li_aNi_{1-b-c}Co_bB'_cD_\alpha$ (where, $0.90 \leq a \leq 1.1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where, $0.90 \leq a \leq 1.1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where, $0.90 \leq a \leq 1.1$, $0 \leq b \leq 0.5$, $0 \leq c \leq 0.05$, and $0 < \alpha < 2$); $Li_aNi_{1-b-c}Mn_bB'_cD_\alpha$ (where, $0.90 \leq a \leq 1.1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where, $0.90 \leq a \leq 1.1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where, $0.90 \leq a \leq 1.1$, $0 \leq b \leq 0.5$, $0 \leq c \leq 0.05$, and $0 < \alpha < 2$); $Li_aNi_bE_cG_dO_2$ (where, $0.90 \leq a \leq 1.1$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.1$ and $0.001 \leq b \leq 0.1$); $Li_aCoG_bO_2$ (where, $0.90 \leq a \leq 1.1$ and $0.001 \leq b \leq 0.1$); $Li_aMnG_bO_2$ (where, $0.90 \leq a \leq 1.1$ and $0.001 \leq b \leq 0.1$); $Li_aMn_2G_bO_4$ (wherein $0.90 \leq a \leq 1.1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the above chemical formulae, A may be at least one of Ni, Co, and Mn, B' may be at least one of Al, Ni, Co, Mn, Cr, Fe, Mg, Sr, V, and a rare earth element; D may be at least one of oxygen (O), fluorine (F), sulfur (S), and phosphorus (P); E may be at least one of Co and Mn; F' may be at least one of F, S, and P; G may be at least one of Al, Cr, Mn, Fe, Mg, La, Ce, Sr, and V; Q may be at least one of Ti, Mo, and Mn; I' may be at least one of Cr, V, Fe, Sc, and Y; and J may be at least one of V, Cr, Mn, Co, Ni, and Cu.

For example, the typical positive active material may include $LiCoO_2$, $LiMn_xO_{2x}$ (where x is 1 or 2), $LiNi_{1-x}Mn_xO_{2x}$ (where $0 < x < 1$), $LiNi_{1-x-y}Co_xMn_yO_2$ (where $0 \leq x \leq 0.5$ and $0 \leq y \leq 0.5$), and $LiFePO_4$.

A surface of the positive active material may further comprise a coating layer. The positive active material having a coating layer may be used alone or as a mixture. The coating layer may include a compound of a coating element such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may comprise at least one of Mg, Al, Co, K, Na, Ca, Si, Ti, V, Sn, Ge, Ga, B, As, and Zr. A formation process (e.g., spray coating or dip-coating) of the coating layer may be any suitable coating method that does not adversely affect the properties of the positive active material. The type of coating method is not limited and may be any suitable coating method, the details of which can be determined by one of skill in the art without undue documentation, and thus is not further disclosed herein for clarity.

Examples of the conducting agent may include at least one of carbon black and graphite particulates, but is not limited thereto, and any suitable conducting agent, including those available in the art, may be used.

Examples of the binder may include at least one of vinylidene fluoride/hexafluoropropylene copolymer, polyvinylidene fluoride (PVDF), polyacrylonitrile, polymethyl methacrylate, polytetrafluoroethylene, and a styrene-butadiene rubber copolymer, but are not limited thereto, and any suitable binder, including those available in the art, may be used.

Examples of the solvent may include at least one of N-methyl-pyrrolidone (NMP), acetone, and water, but are not limited thereto, and any suitable solvent, including those available in the art, may be used.

The amounts of the positive active material, the conducting agent, the binder, and the solvent may be amounts that are used in the manufacture of a lithium battery. Depending on the use or structure of the lithium battery, one or more of the conducting agent, the binder, and the solvent may be omitted.

In another exemplary embodiment, a lithium battery may include a positive electrode including the composite positive active material. The lithium battery may be prepared as follows.

A positive electrode may be prepared according to the positive electrode preparation method.

Next, a negative electrode may be prepared as follows. The negative electrode may be prepared in the same manner as the method of preparing the positive electrode, except that a negative active material is used instead of the composite positive active material. In addition, in a composition for forming the negative active material, the conducting agent, the binder, and the solvent may be the same as those previously defined in connection with the preparation of the positive electrode.

For example, the composition for forming the negative active material may be prepared by mixing a negative active material, a conducting agent, a binder, and a solvent, and then the composition for forming the negative active material may be directly coated on a copper current collector to prepare a negative electrode plate. Alternatively, the composition for forming the negative active material may be cast on a separate support to form a negative active material film, which is then separated from the support and laminated on a copper current collector to prepare a negative electrode plate.

In addition, as the negative active material used herein, any suitable material, including those available in the art as a negative active material, may be used. For example, the negative active material may include at least one selected from a lithium metal, a metal alloyable with lithium, a transition metal oxide, a non-transition metal oxide, and a carbonaceous material.

Examples of the metal alloyable with lithium may include at least one selected from Si, Sn, Al, Ge, Pb, Bi, Sb, a Si—Y' alloy (wherein Y' is an alkaline metal, an alkaline earth metal, a Group 13 element, a Group 14 element, a transition metal, a rare earth element, or a combined element thereof, and is not Si), and a Sn—Y'' alloy (wherein Y'' is an alkaline metal, an alkaline earth metal, a Group 13 element, a Group 14 element, a transition metal, a rare earth element, or a combined element thereof, and is not Sn). Examples of the element Y' and Y'' may each independently include at least one selected from Mg, Ca, Sr, Ba, radium (Ra), Sc, Y, Ti, Zr, hafnium (Hf), rutherfordium (Rf), V, Nb, tantalum (Ta), dubnium (Db), Cr, Mo, tungsten (W), seaborgium (Sg), technetium (Tc), Re, bohrium (Bh), Fe, Pb, Ru, osmium (Os), hassium (Hs), rhodium (Rh), iridium (Ir), palladium (Pd), Pt, Cu, silver (Ag), gold (Au), Zn, Cd, B, Al, Ga, Sn, indium (In), Ti, Ge, P, As, stibnite (Sb), Bi, S, Se, tellurium (Te), and polonium (Po).

Examples of the transition metal oxide may include at least one selected from a lithium titanium oxide, a vanadium oxide, and a lithium vanadium oxide.

Examples of the non-transition metal oxide may include at least one selected from $SnO_2$ and $SiO_x$ (where $0<x<2$).

The carbonaceous material may be at least one selected from crystalline carbon and amorphous carbon. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, or fired coke.

The amounts of the negative active material, the conducting agent, the binder, and the solvent can be those levels that are used in the manufacture of a lithium battery.

Next, a separator to be disposed between the positive electrode and the negative electrode may be prepared. The separator for the lithium battery may be any suitable separator that is capable of being used in lithium batteries. The separator may have low resistance to migration of ions in an electrolyte and have an excellent electrolyte-retaining ability. For example, the separator may be at least one selected from glass fiber, polyester, Teflon, polyethylene, polypropylene, and polytetrafluoroethylene (PTFE), each of which may be in the form of a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a composition for forming the separator. The composition for forming the separator may be directly coated and dried on an electrode to form the separator. Alternatively, the composition for forming the separator may be cast on a support and then dried to form a separator film, which may then be separated from the support and laminated on an electrode to form the separator.

The polymer used to manufacture the separator may be any suitable material that is used as a binder for electrode plates. For example, the polymer may include at least one selected from a vinylidenefluoride/hexafluoropropylene copolymer, polyvinylidene fluoride (PVDF), polyacrylonitrile, and polymethyl methacrylate (PMMA).

Next, an electrolyte may be prepared.

For example, the electrolyte may be an organic electrolyte. In addition, the electrolyte may be a solid electrolyte. Examples of the electrolyte may include a boron oxide and a lithium oxynitride, but are not limited thereto, and any suitable solid electrolyte, including those available in the art, may be used. The solid electrolyte may be formed on the negative electrode using a sputtering method.

For example, an organic electrolyte solution may be prepared. The organic electrolyte solution may be prepared by dissolving a lithium salt in an organic solvent.

The organic solvent may include any suitable organic solvent available in the art. Examples of the organic solvent may include at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethylacetamide, dimethylsulfoxide, dioxane, 1,2-dimethoxyethane, sulforane, dichloroethane, chlorobenzene, nitrobenzene, diethyleneglycol, and dimethyl ether.

The lithium salt may include any suitable material available as a lithium salt. For example, the lithium salt may include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, and LiI.

Figure 2:
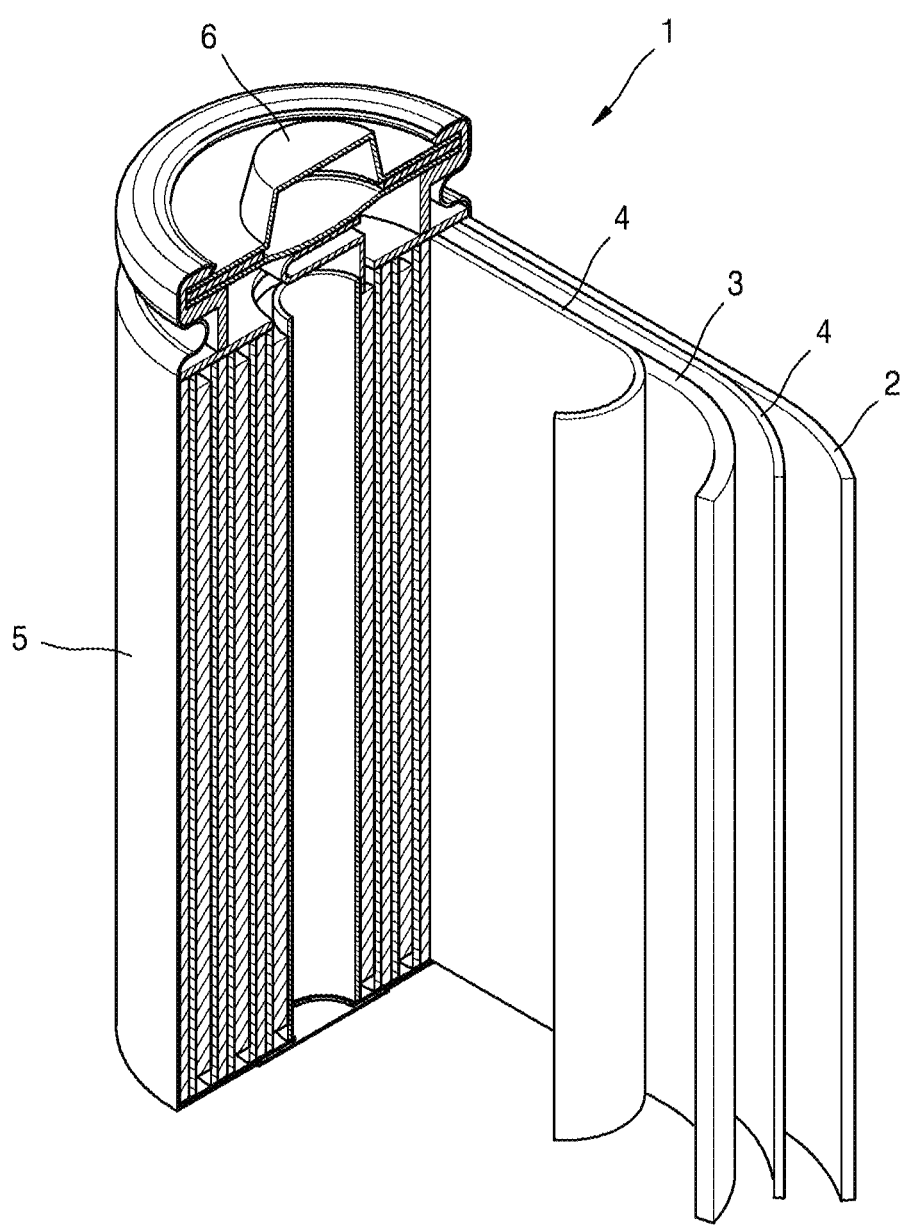
FIG. 2 is a schematic view of a lithium battery according to an embodiment.

As shown in FIG. 2, a lithium battery 1 includes a positive electrode 3, a negative electrode 2, and a separator 4. The positive electrode 3, the negative electrode 2, and the separator 4 are either wound or folded and then accommodated in a battery case 5. Then, the battery case 5 is filled with an organic electrolyte solution and sealed. The battery case 5 may be a cylindrical type, a rectangular type, or a thin-film type. For example, the lithium battery 1 may be a large-sized, thin-film type battery. The lithium battery 1 may be a lithium ion battery.

The separator may be interposed between the positive electrode and the negative electrode to form a battery assembly. The battery assembly may be stacked in a bi-cell structure and impregnated with an organic electrolyte solution. The resultant battery assembly may then be put into a pouch and hermetically sealed, thereby completing manufacture of a lithium ion polymer battery.

Alternatively, a plurality of battery assemblies may be stacked to form a battery pack, which may be used in any device that can benefit from high capacity and high output. For example, such a battery pack may be used in a laptop computer, a smart phone, or an electric vehicle (EV).

In addition, due to the excellent lifespan characteristics and high rate characteristics, the lithium battery may be used in an EV or a hybrid vehicle, such as a plug-in hybrid electric vehicle (PHEV). Also, the lithium battery may be used in a device that utilizes a high electric power storage, such as electric bicycles or electrical tools.

In another exemplary embodiment, the composite positive active material may be prepared by the following method.

Preparing a solution including a first metal oxide precursor; precipitating the first metal oxide precursor to obtain a first metal hydroxide; and mixing the first metal hydroxide, a lithium precursor, a second metal oxide precursor, and a doping element precursor to form a mixture; and heat treating the mixture.

The first metal oxide precursor may include at least one transition metal precursor. For example, the transition metal precursor may be at least one selected from a nickel precursor, a cobalt precursor, a manganese precursor, and a precursor of another metal. For example, the nickel precursor may be nickel sulfate or nickel acetate, the cobalt precursor may be cobalt sulfate or cobalt acetate, the manganese precursor may be manganese sulfate or manganese acetate, and the precursor of another metal may be copper sulfate, tin chloride, titanium isopropoxide, or ruthenium acetylacetonate. A molar ratio for mixing these precursor metals may be selected based upon the composition of the desired final product.

In the step of precipitating of the first metal oxide precursor to prepare the first metal hydroxide, the precipitating process may be performed using a chelating agent and a precipitating agent. The chelating agent may be an ammonium hydroxide. The precipitating agent may be a sodium hydroxide. The precipitated first metal hydroxide may be filtered, washed, and dried to prepare a final dried product.

In the mixture of the first metal hydroxide, the lithium precursor, the second metal oxide precursor, and the doping element, the lithium precursor may be lithium carbonate, the second metal oxide precursor may be nickel hydroxide, and the doping element precursor may be sodium carbonate.

The heat-treating of the precipitate may be performed at a temperature in a range of about 600° C. to about 1,100° C. for about 5 hours to about 48 hours. However, the time and temperature are not limited thereto, and the temperature and time for the heat-treating may be appropriately selected based upon to the composition and physical properties of the desired final product. For example, the heat-treating of the precipitate may be performed at a temperature a range of about 750° C. to about 900° C. The heat-treated composite negative active material may be dry-cooled in a furnace. The heat-treatment may be performed in ambient air, but is not limited thereto, and the heat-treatment may also be performed in an oxidizing atmosphere.

The present invention will be described in further detail with reference to the following examples. These examples are for illustrative purposes only and shall not limit the scope of the present disclosure.

EXAMPLES

Ratio Test of a Composite of a Layered Crystal Structure and a Rocksalt Crystal Structure Comparative Preparation Example 1: Preparation of a Composite Positive Active Material A composite positive active material was synthesized according to co-precipitation process that will be described later.

Starting materials, e.g., nickel sulfate, cobalt sulfate, and manganese sulfate, were stoichiometrically mixed to prepare a composite positive active material ($0.4Li_2MnO_3 \cdot 0.6LiNi_{0.417}Co_{0.167}Mn_{0.417}O_2$)

Nickel sulfate, cobalt sulfate, and manganese sulfate were dissolved in distilled water to prepare a solution having a concentration of 2 molar (M) to prepare a precursor mixture.

A chelating agent (e.g., $NH_4OH$) and a precipitating agent e.g., (NaOH) were added to the precursor mixture to perform co-precipitation, and thus the precipitate $(Ni,Co,Mn)(OH)_2$ was obtained.

The precipitate $(Ni,Co,Mn)(OH)_2$ was washed with distilled water and dried at a temperature of 80° C. for 12 hours, and then mixed with lithium carbonate ($Li_2CO_3$). Here, the $Li_2CO_3$ was stoichiometrically mixed with the precipitate to prepare a composite positive active material ($0.4Li_2MnO_3 \cdot 0.6LiNi_{0.417}Co_{0.167}Mn_{0.417}O_2$).

The mixture was heat-treated at a temperature of 750° C. for 10 hours in ambient air, and thus a composite positive active material ($0.4Li_2MnO_3 \cdot 0.6LiNi_{0.417}Co_{0.167}Mn_{0.417}O_2$) was prepared.

Comparative Preparation Example 2: Preparation of a Composite Positive Active Material $(Ni,Co,Mn)(OH)_2$ powder was prepared in the same manner as in Comparative Example 1.

The $(Ni,Co,Mn)(OH)_2$ powder was mixed with lithium carbonate $Li_2CO_3$ and nickel hydroxide ($Ni(OH)_2$). Here, the $Li_2CO_3$ and the $Ni(OH)_2$ were stoichiometrically mixed to prepare a composite positive active material ($0.98(0.4Li_2MnO_3 \cdot 0.6LiNi_{0.417}Co_{0.167}Mn_{0.417}O_2) \cdot 0.02NiO$).

The mixture was heat-treated at a temperature of 750° C. for 10 hours in the air, and thus a composite positive active material ($0.98(0.4Li_2MnO_3 \cdot 0.6LiNi_{0.417}Co_{0.167}Mn_{0.417}O_2) \cdot 0.02NiO$) was prepared.

Comparative Preparation Example 3: Preparation of a Composite Positive Active Material $(Ni,Co,Mn)(OH)_2$ powder was prepared in the same manner as described in Comparative Example 1.

The $(Ni,Co,Mn)(OH)_2$ powder was mixed with lithium carbonate ($Li_2CO_3$) and nickel hydroxide $Ni(OH)_2$. Here, the $Li_2CO_3$ and the $Ni(OH)_2$ were stoichiometrically mixed to prepare a composite positive active material ($0.95(0.4Li_2MnO_3 \cdot 0.6LiNi_{0.417}Co_{0.167}Mn_{0.417}O_2) \cdot 0.05NiO$).

The mixture was heat-treated at a temperature of 750° C. for 10 hours in the air, and thus a composite positive active material ($0.95(0.4Li_2MnO_3 \cdot 0.6LiNi_{0.417}Co_{0.167}Mn_{0.417}O_2) \cdot 0.05NiO$) was prepared.

Comparative Preparation Example 4: Preparation of a Composite Positive Active Material $(Ni,Co,Mn)(OH)_2$ powder was prepared in the same manner as in Comparative Example 1.

The $(Ni,Co,Mn)(OH)_2$ powder was mixed with lithium carbonate $Li_2CO_3$ and nickel hydroxide $Ni(OH)_2$. Here, the $Li_2CO_3$ and the $Ni(OH)_2$ were stoichiometrically mixed to prepare a composite positive active material ($0.9(0.4Li_2MnO_3 \cdot 0.6LiNi_{0.417}Co_{0.167}Mn_{0.417}O_2) \cdot 0.1 NiO$).

The mixture was heat-treated at a temperature of about 750° C. for 10 hours in ambient air, and thus a composite positive active material ($0.9(0.4Li_2MnO_3 \cdot 0.6LiNi_{0.417}Co_{0.167}Mn_{0.417}O_2) \cdot 0.1 NiO$) was prepared.

Comparative Preparation Example 2: Preparation of a Composite Positive Active Material $(Ni,Co,Mn)(OH)_2$ powder was prepared in the same manner as in Comparative Example 1.

The (Ni,Co,Mn)(OH)$_2$ powder was mixed with Li$_2$CO$_3$ and Ni(OH)$_2$. Here, the Li$_2$CO$_3$ and the Ni(OH)$_2$ were stoichiometrically mixed to prepare a composite positive active material (0.8(0.4Li$_2$MnO$_3$.0.6LiNi$_{0.417}$Co$_{0.167}$Mn$_{0.417}$O$_2$).0.2NiO).

The mixture was heat-treated at a temperature of 750° C. for 10 hours in the air, and thus a composite positive active material (0.8(0.4Li$_2$MnO$_3$.0.6LiNi$_{0.417}$Co$_{0.167}$Mn$_{0.417}$O$_2$).0.2 NiO) was prepared.

Preparation Example 1: Preparation of a Composite Positive Active Material Doped with 2 Mole Percent of Na (Ni,Co,Mn)(OH)$_2$ powder was prepared in the same manner as in Comparative Example 1.

The (Ni,Co,Mn)(OH)$_2$ powder was mixed with Li$_2$CO$_3$, Ni(OH)$_2$, and sodium carbonate (Na$_2$CO$_3$). Here, the Li$_2$CO$_3$, the Ni(OH)$_2$, and the Na$_2$CO$_3$ were stoichiometrically mixed to prepare a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO). The Li$_2$CO$_3$ and the Na$_2$CO$_3$ were mixed so that an amount of sodium was 2 mole percent (mol %) with respect to the total mole number of lithium (i.e., Na/Li mole ratio=0.02).

The mixture was heat-treated at a temperature of 750° C. for 10 hours in the air, and thus a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO) was prepared.

Preparation Example 2: Preparation of a Composite Positive Active Material Doped with 4 Mol % of Na (Ni,Co,Mn)(OH)$_2$ powder was prepared in the same manner as in Comparative Example 1.

The (Ni,Co,Mn)(OH)$_2$ powder was mixed with Li$_2$CO$_3$, Ni(OH)$_2$, and Na$_2$CO$_3$. Here, the Li$_2$CO$_3$, the Ni(OH)$_2$, and the Na$_2$CO$_3$ were stoichiometrically mixed to prepare a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO). The Li$_2$CO$_3$ and the Na$_2$CO$_3$ were mixed so that an amount of sodium was 4 mol % with respect to the total mole number of lithium (i.e., Na/Li mole ratio=0.04).

The mixture was heat-treated at a temperature of 750° C. for 10 hours in the air, and thus a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO) was obtained.

Preparation Example 3: Preparation of a Composite Positive Active Material Doped with 8 Mol % of Na (Ni,Co,Mn)(OH)$_2$ powder was prepared in the same manner as in Comparative Example 1.

The (Ni,Co,Mn)(OH)$_2$ powder was mixed with Li$_2$CO$_3$, Ni(OH)$_2$, and Na$_2$CO$_3$. Here, the Li$_2$CO$_3$, the Ni(OH)$_2$, and the Na$_2$CO$_3$ were stoichiometrically mixed to prepare a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO). The Li$_2$CO$_3$ and the Na$_2$CO$_3$ were mixed so that an amount of sodium was 8 mol % with respect to the total mole number of lithium (i.e., Na/Li mole ratio=0.08).

The mixture was heat-treated at a temperature of 750° C. for 10 hours in the air, and thus a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO) was prepared.

Preparation Example 4: Preparation of a Composite Positive Active Material Doped with 12 Mol % of Na (Ni,Co,Mn)(OH)$_2$ powder was prepared in the same manner as in Comparative Example 1.

The (Ni,Co,Mn)(OH)$_2$ powder was mixed with Li$_2$CO$_3$, Ni(OH)$_2$, and Na$_2$CO$_3$. Here, the Li$_2$CO$_3$, the Ni(OH)$_2$, and the Na$_2$CO$_3$ were stoichiometrically mixed to prepare a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO). The Li$_2$CO$_3$ and the Na$_2$CO$_3$ were mixed so that an amount of sodium was 12 mol % with respect to the total mole number of lithium (i.e., Na/Li mole ratio=0.12).

The mixture was heat-treated at a temperature of 750° C. for 10 hours in the air, and thus a composite positive active material (0.95[0.4(Li$_{2-b}$Na$_b$)MnO$_3$.0.6(Li$_{1-d}$Na$_d$)Ni$_{0.417}$Co$_{0.167}$Mn$_{0.417}$O$_2$].0.05NiO) was prepared.

Preparation of a Positive Electrode and a Lithium Battery

Comparative Example 1

The composite positive active material powder prepared in Comparative Example 1, a carbonaceous conducting agent (Denka Black) and a binder (e.g., polyvinylidene fluoride (PVDF)) were homogenously mixed with a solvent (e.g., N-methylpyrrolidone (NMP)) at a weight ratio of 90:5:5 to prepare a slurry.

An aluminum foil having a thickness of 15 μm was coated with the slurry at a loading amount of 6 milligrams per square centimeter (mg/cm$^2$) using a doctor blade, vacuum-dried at a temperature of 120° C. for 2 hours, pressed using a roll-press to prepare a positive electrode plate having a mixture density of about 2.4 grams per cubic centimeter (g/cc), and preparing a coin cell (CR2032 type) having a diameter of 12 millimeters (mm).

In the preparation of the cell, metal lithium was used as a counter electrode, a ceramic-coated PE separator was used as a separator, and 1.3 M LiPF6 dissolved in a mixture solvent including ethylene carbonate (EC), ethylmethylcarbonate (EMC), and diethylcarbonate (DEC) at a volume ratio of 3:5:2 was used as an electrolyte.

Comparative Examples 2 to 5

Lithium batteries were prepared in the same manner as described in Comparative Example 1, except that the composite positive active materials prepared in Comparative Preparation Examples 2 to 5 were used, respectively.

Examples 1 to 4

Lithium batteries were prepared in the same manner as described in Comparative Example 1, except that the composite positive active materials prepared in Preparation Examples 1 to 4 were used, respectively.

Evaluation Example 1: X-Ray Diffraction (XRD) Test (1)

Figure 3A:
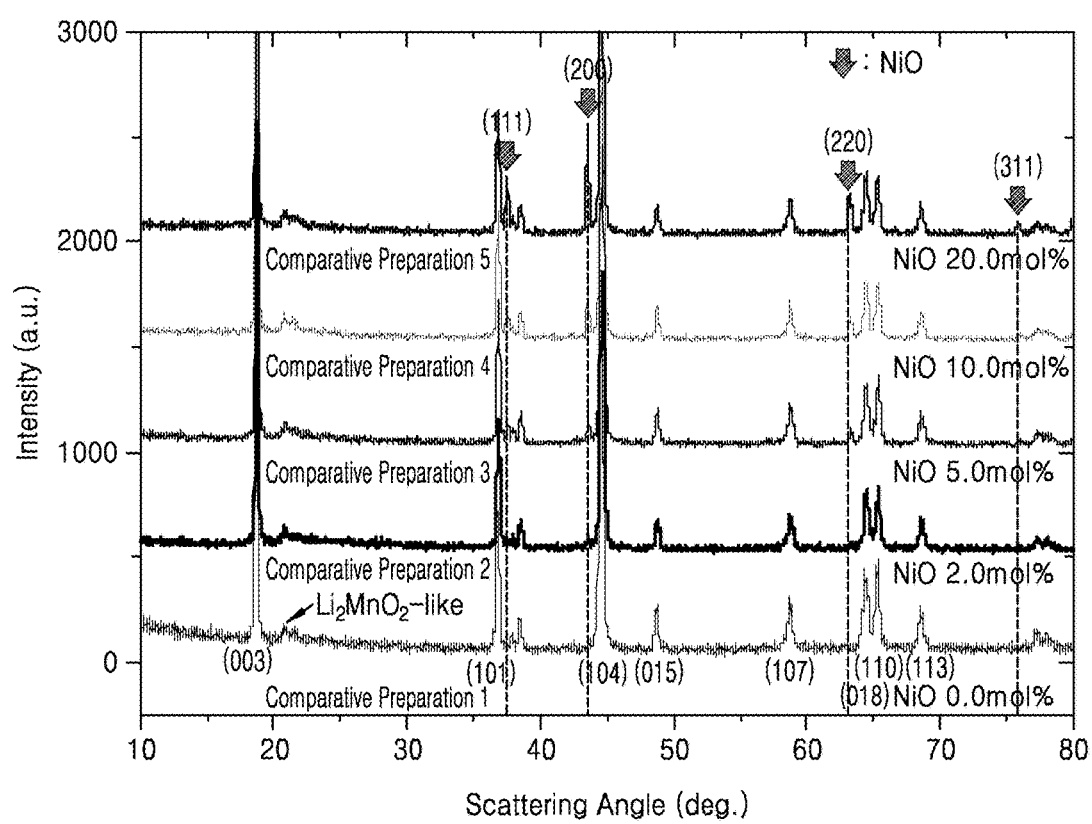
Figure 3B:
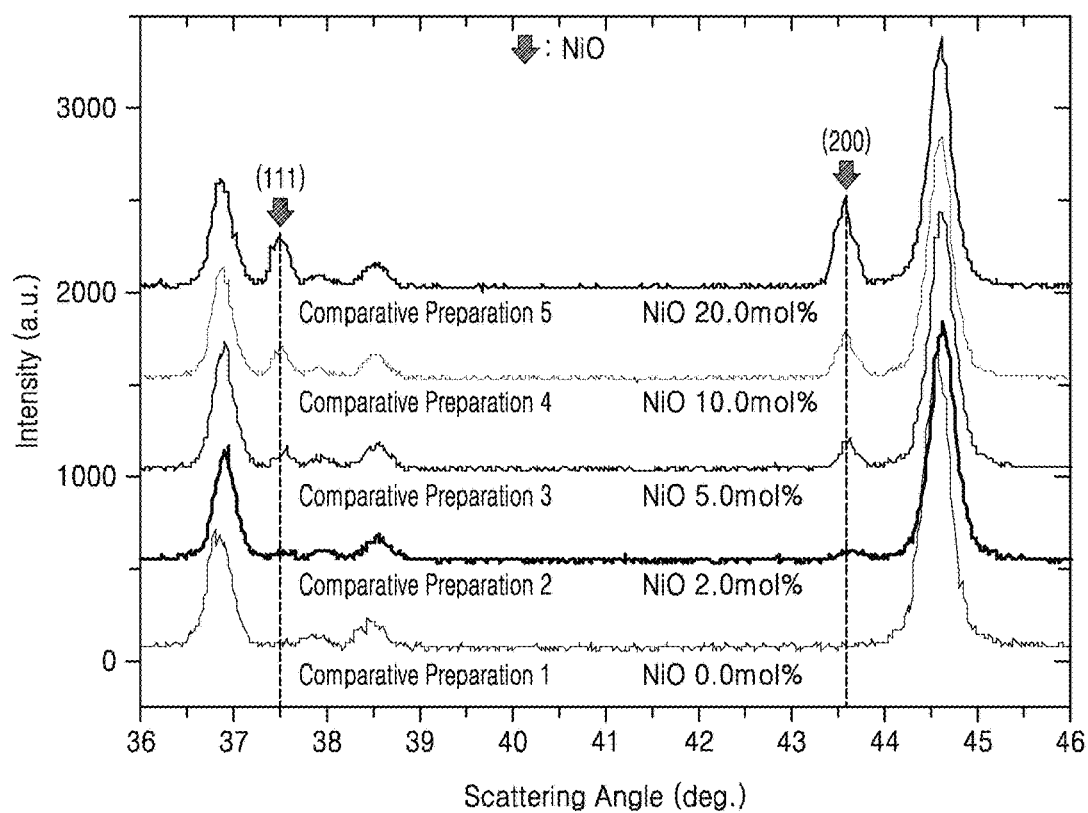
Figure 3C:
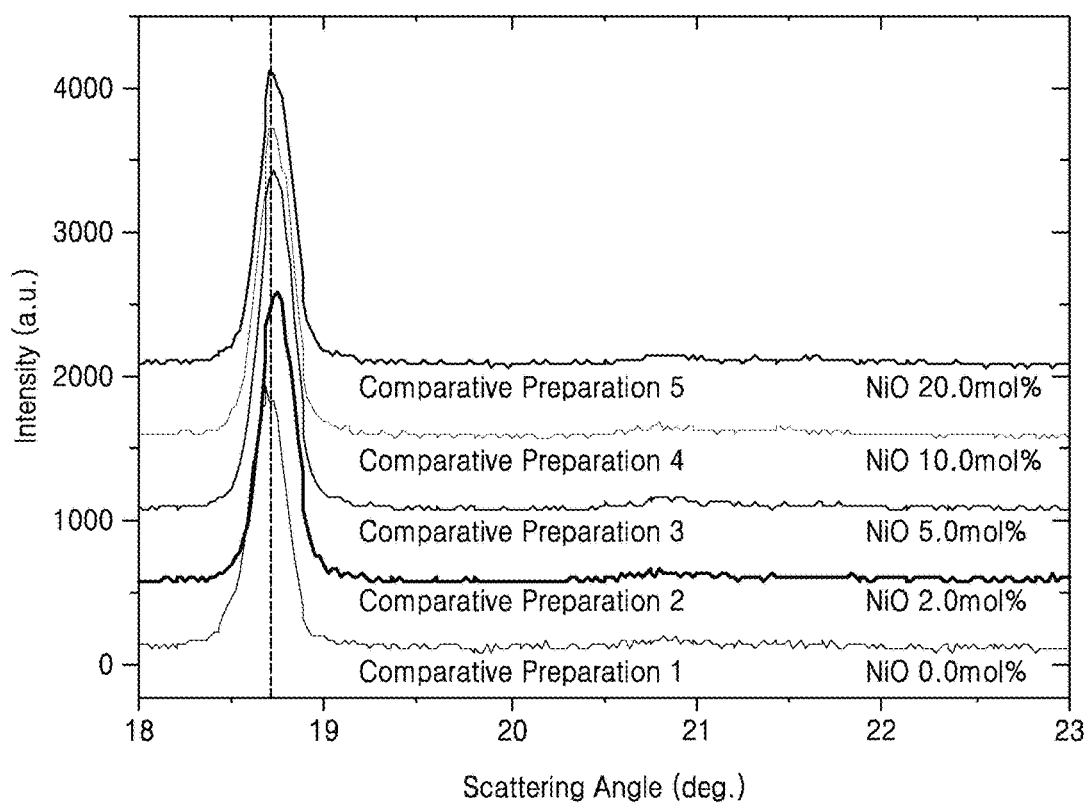

An XRD test was performed on the composite positive active materials prepared in Comparative Preparation Examples 1 to 5, and the results are shown in FIGS. 3A to 3C. The XRD was measured by using Cu—Kα radiation.

As shown in FIGS. 3A to 3C, main feature peaks corresponding to the $LiNi_{0.417}Co_{0.167}Mn_{0.417}O_2$ phase appeared at a scattering angle in a range of about 18.5° to about 19° while feature peaks corresponding to the $Li_2MnO_3$ appeared at a scattering angle in a range of about 20° to about 20.5°. In addition, it was observed that the NiO phase had feature peaks (e.g., 111 and 200 peaks) corresponding to a rocksalt crystal structure with respect to an amount of doped Na of 2 mol % or more. That is, the co-existence of a lithium transition metal oxide having the layered crystal structure and a metal oxide having the rocksalt crystal structure was inferred.

In this regard, it was confirmed that the lithium transition metal oxide having the layered crystal structure and the metal oxide having the rocksalt crystal structure formed a composite, and the metal oxide having the rocksalt crystal structure was intermixed in the crystal structure of the lithium transition metal oxide having the layered crystal structure.

Evaluation Example 1: XRD Test(2)

Figure 4A:
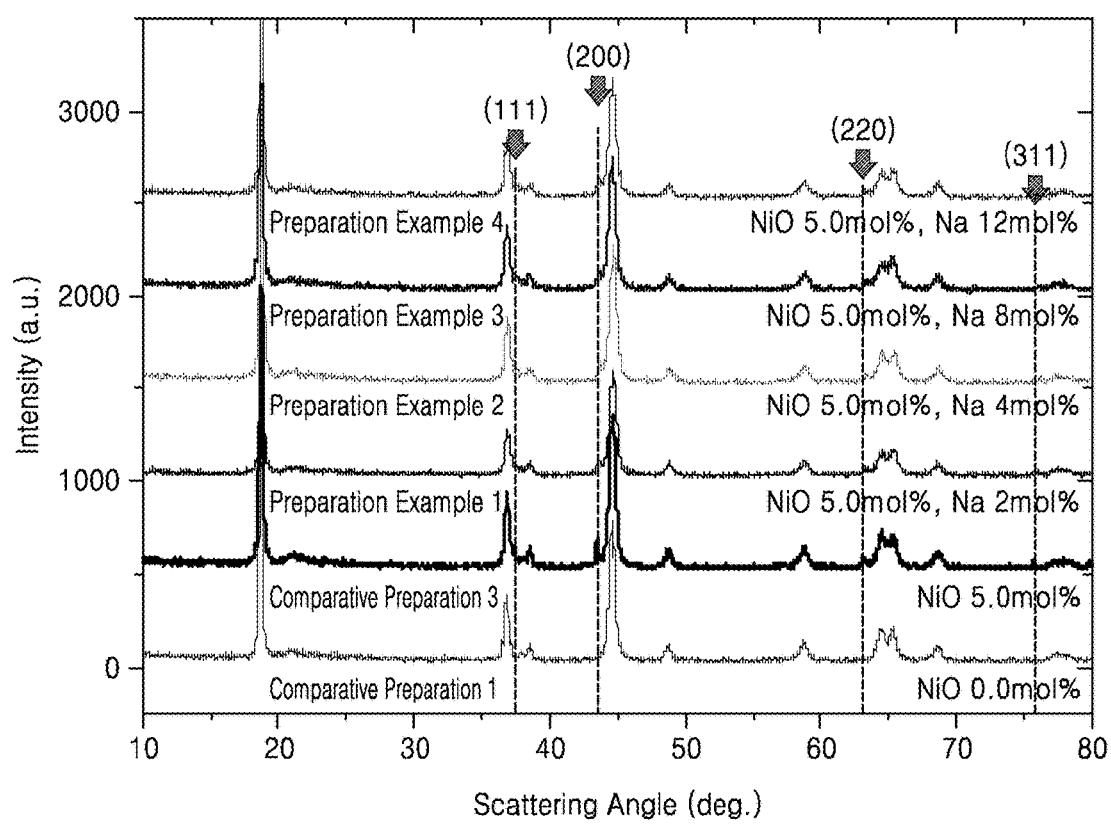
Figure 4B:
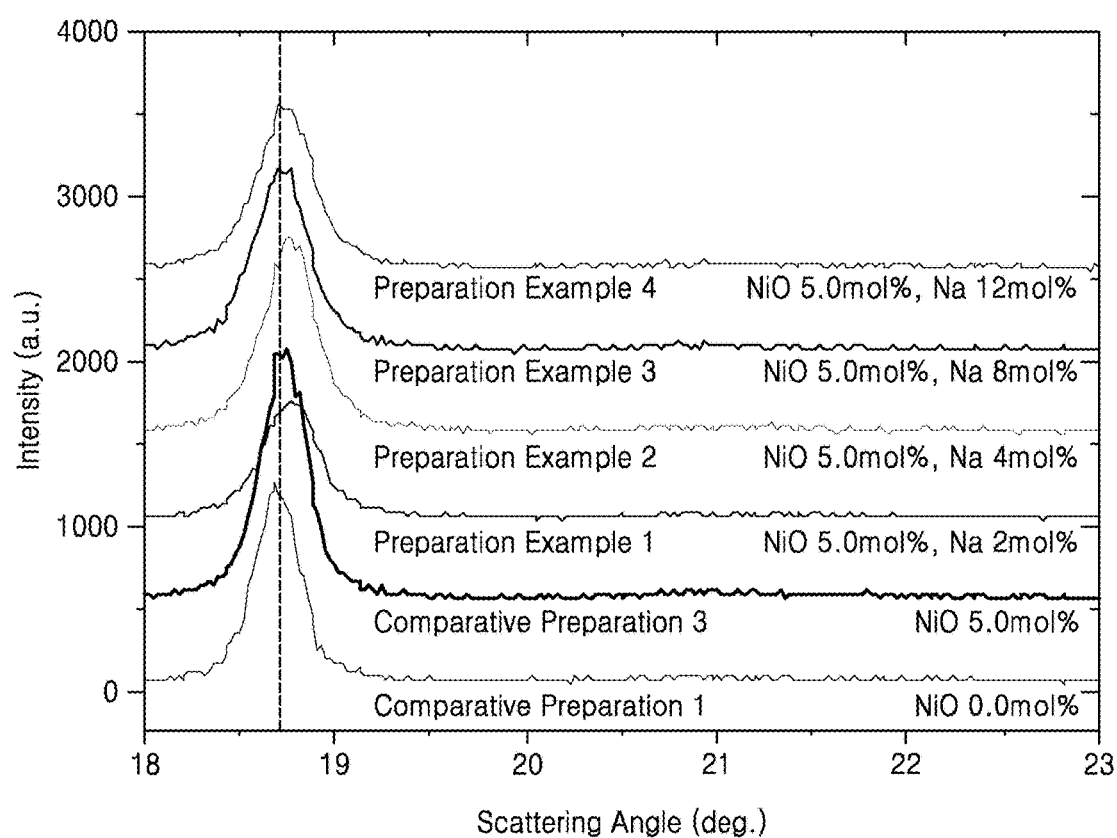
Figure 4C:
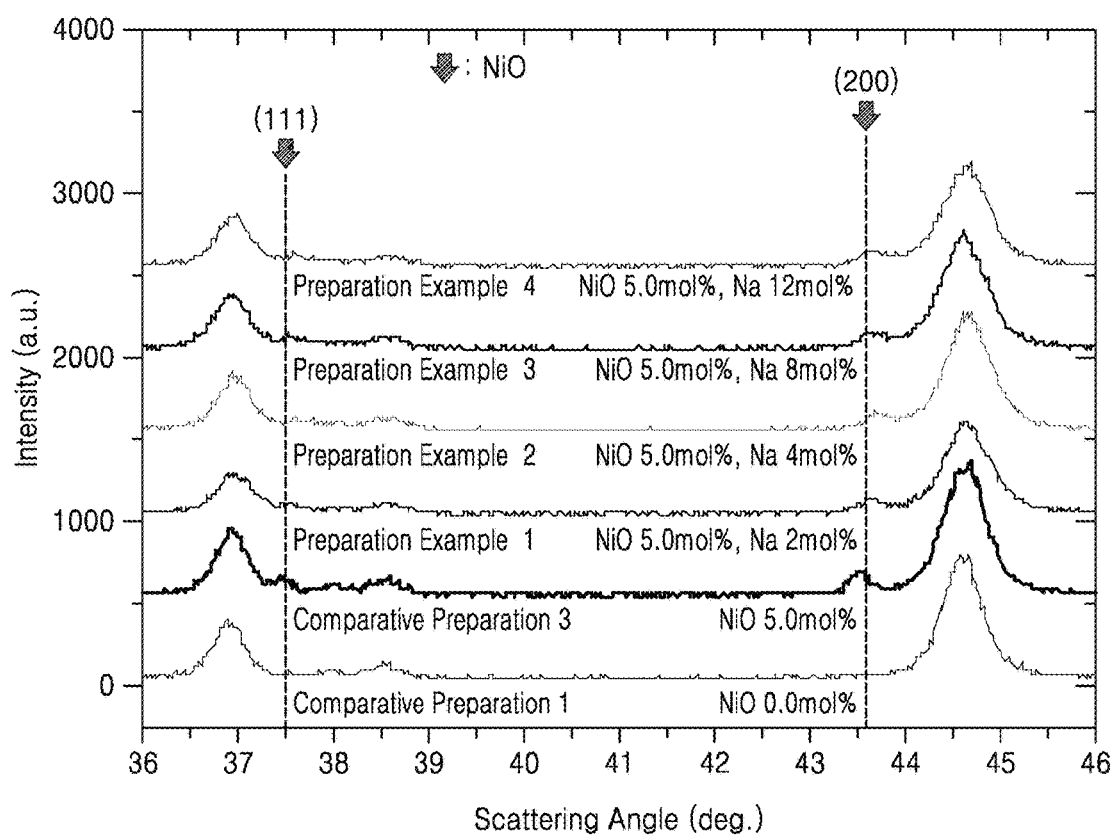
Figure 5A:
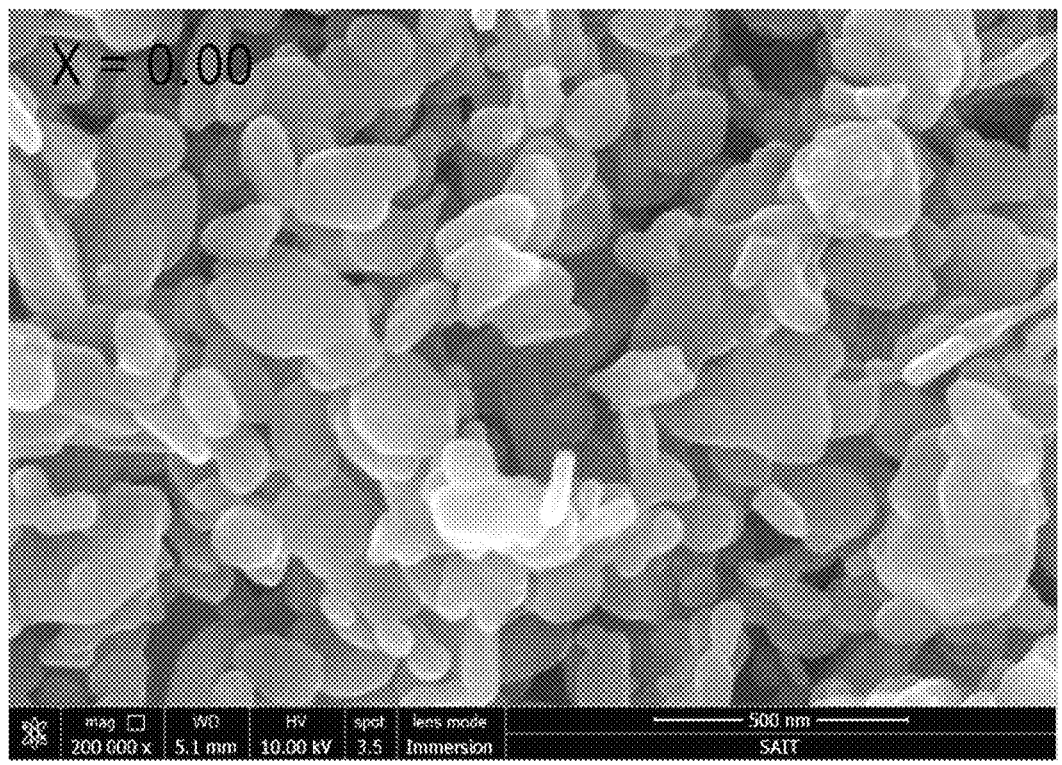
FIGS. 5A, 5B, 5C, 5D, and 5E are field emission scanning electron microscope (FESEM) images of the composite positive active materials prepared in Comparative Examples 1 to 5, respectively.
Figure 5B:
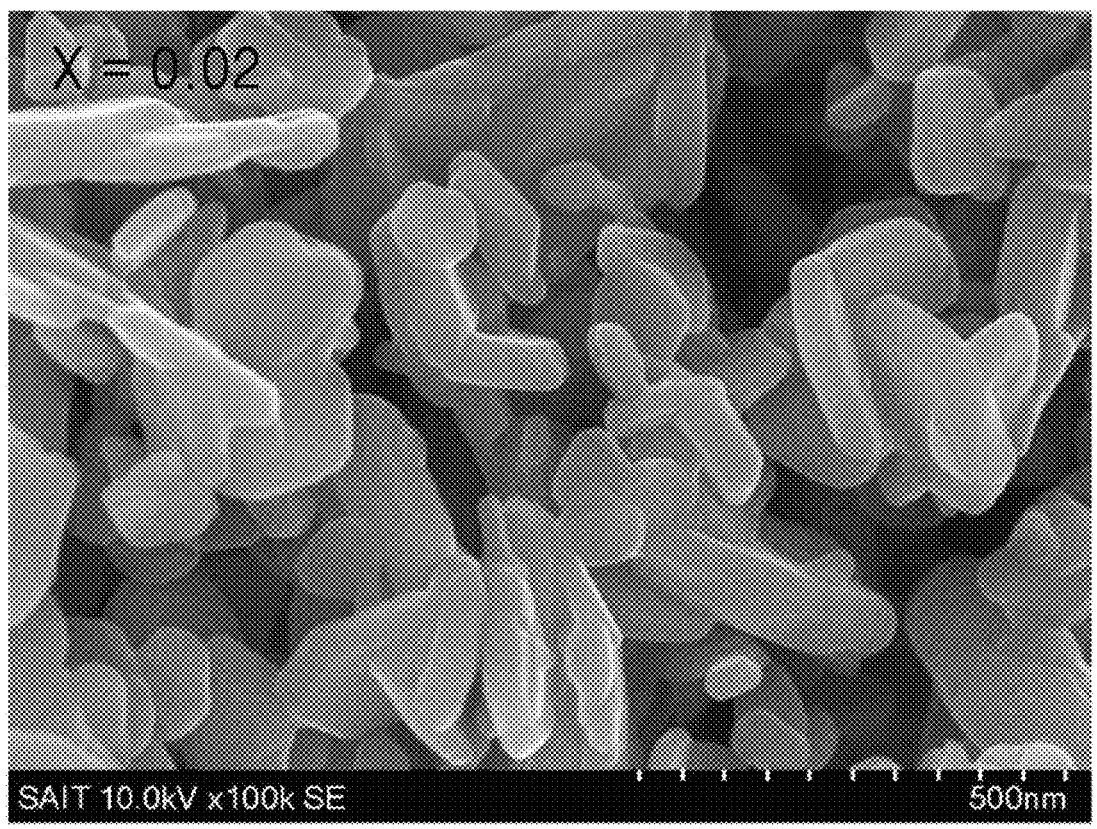
Figure 5C:
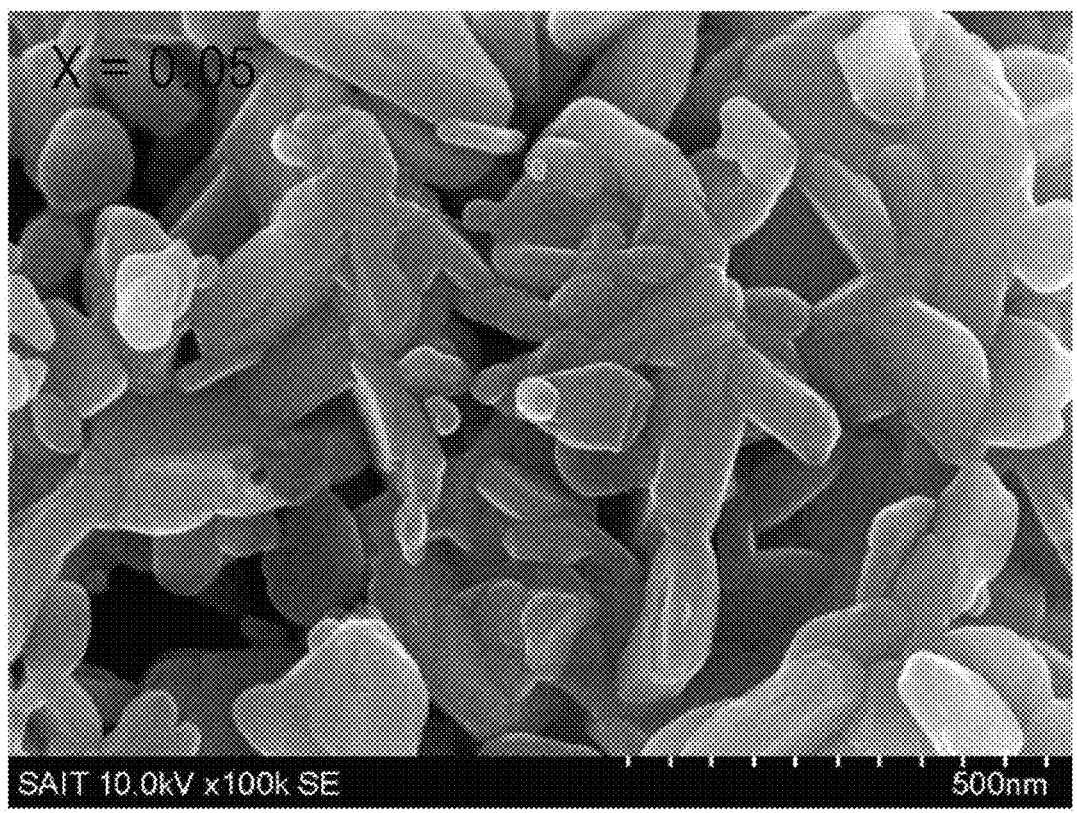
Figure 5D:
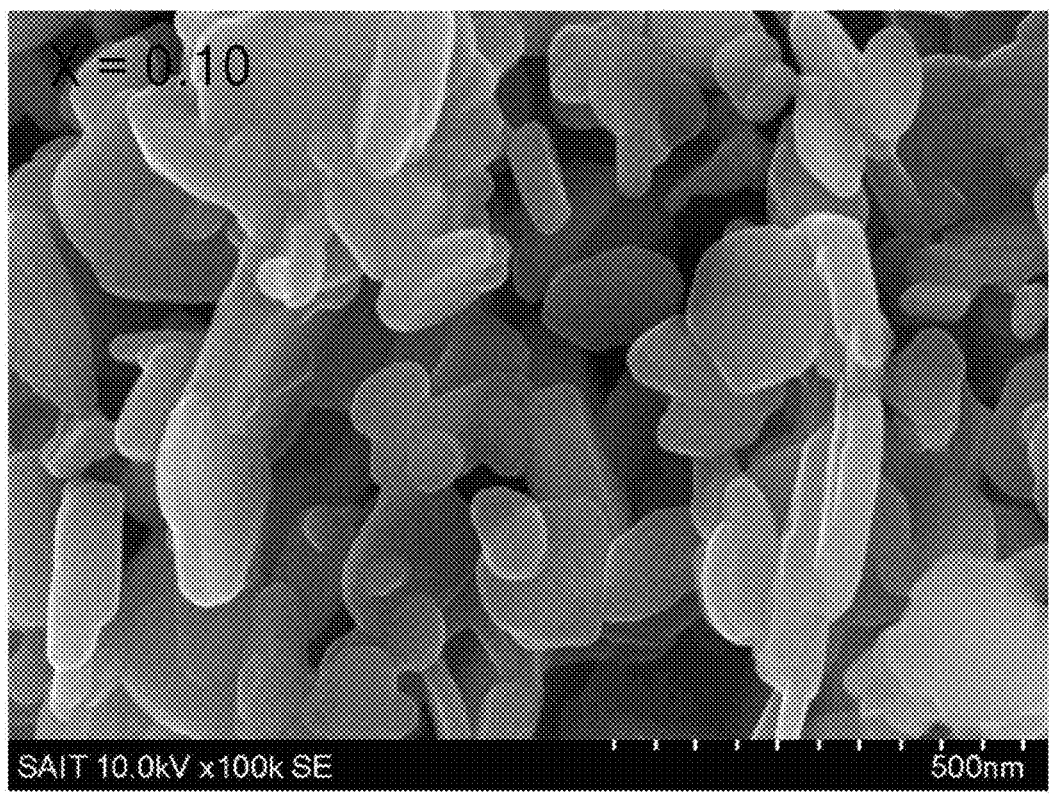
Figure 5E:
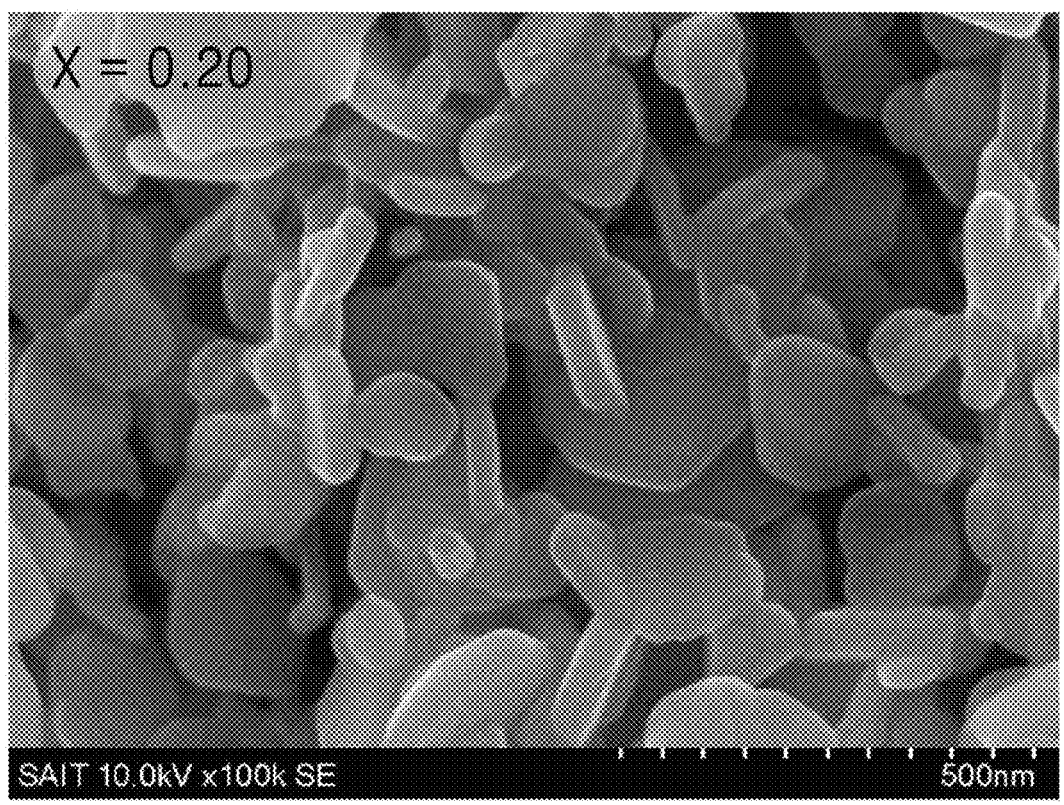
Figure 6A:
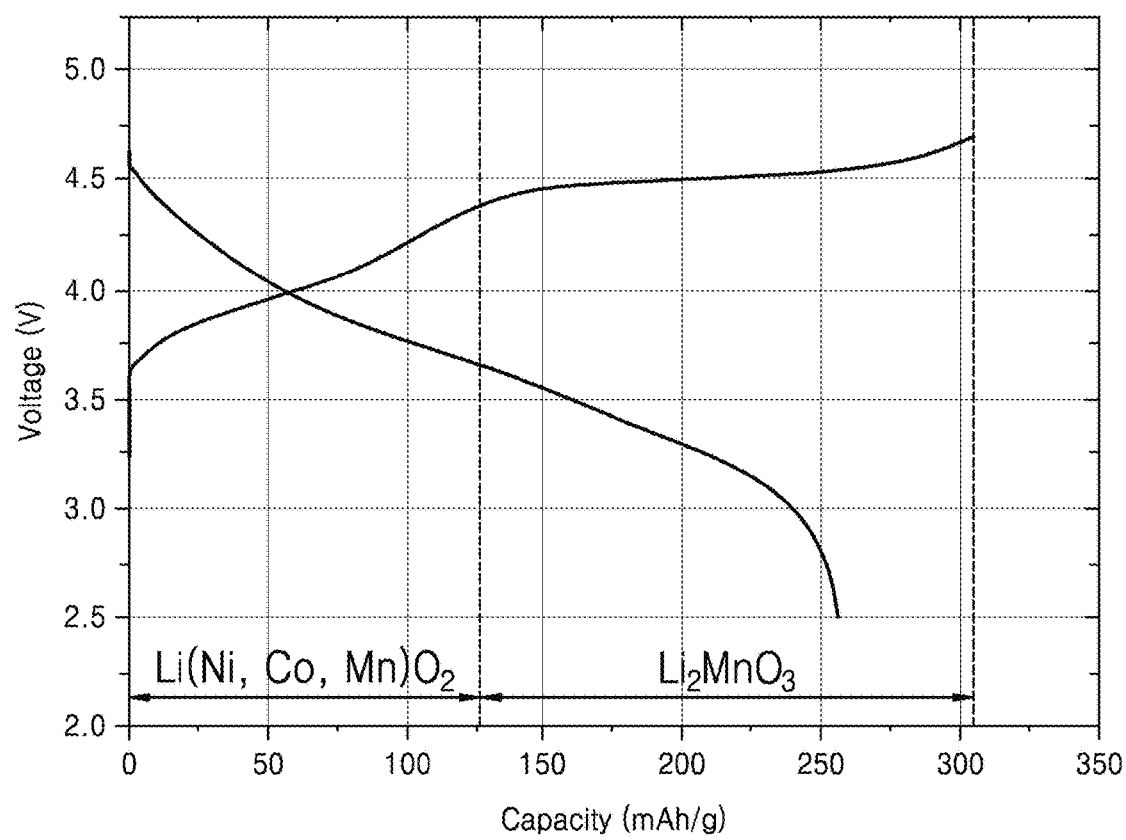
FIGS. 6A, 6B, 6C, and 6D are each a graph of voltage (V) versus capacity (mAh/g) during a $1^{st}$ cycle of charging and discharging of lithium batteries prepared in Comparative Examples 2 to 5, respectively.
Figure 6B:
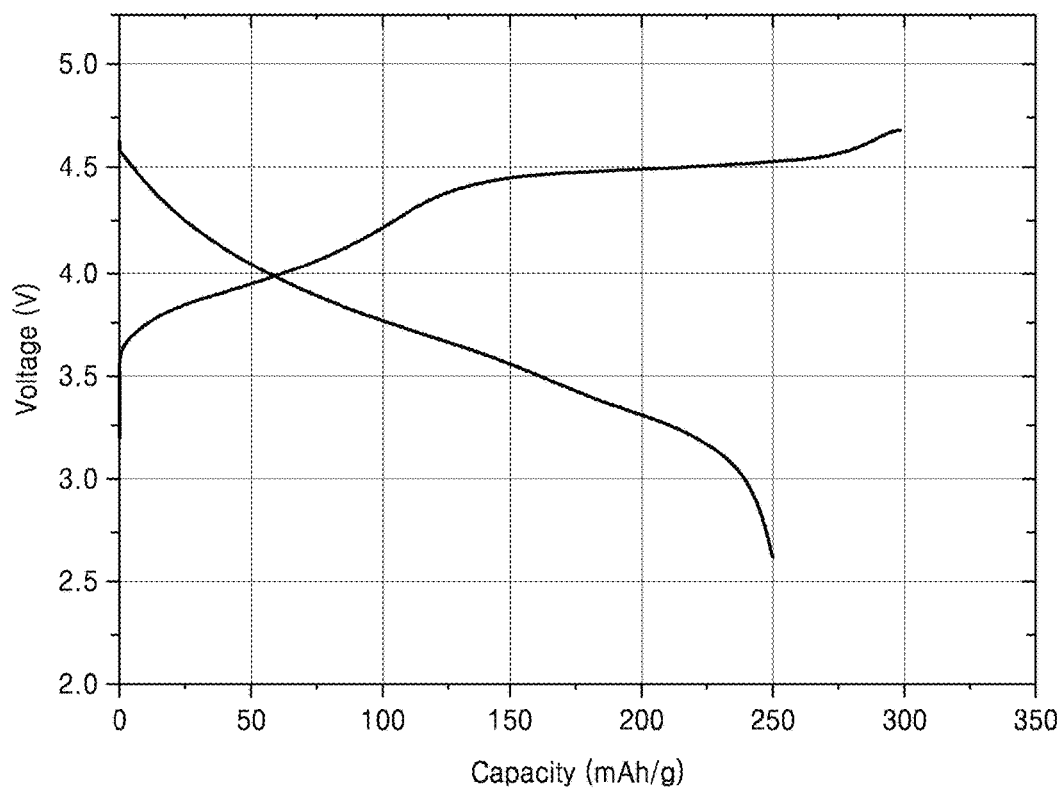
Figure 6C:
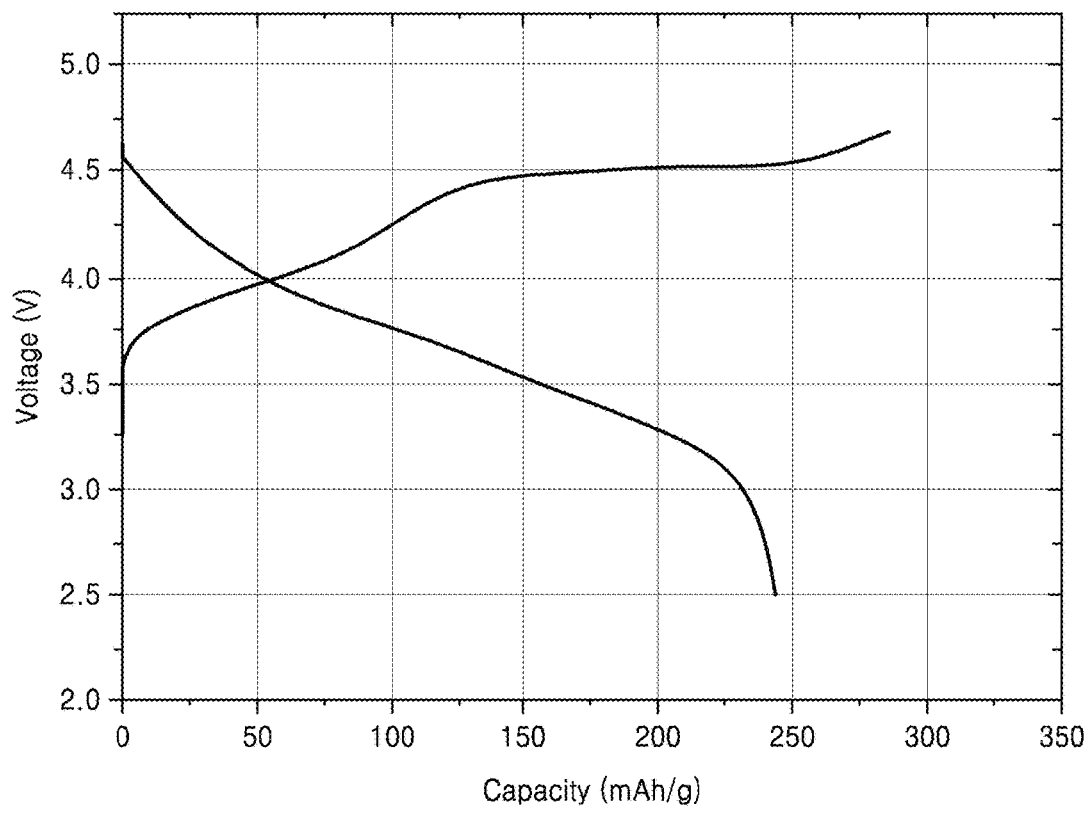
Figure 6D:
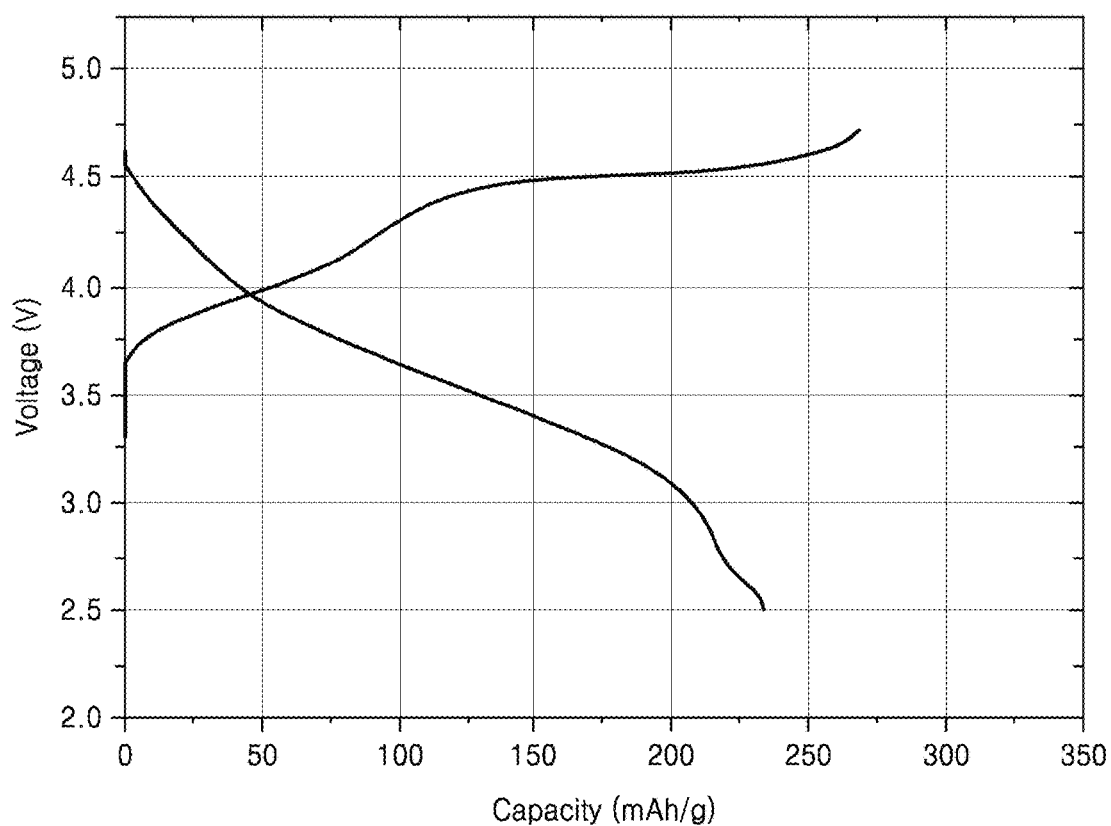

An XRD test was performed on the composite positive active material powders prepared in Comparative Preparation Examples 1 and 3 and Preparation Examples 1 to 4, and the results are shown in FIGS. 4A to 4C. The XRD was measured using Cu—Kα radiation.

As shown in FIGS. 4A to 4C, and as in the case of the composite positive active material powders prepared in Comparative Preparation Examples 1 and 3, the co-existence of the lithium transition metal oxide having the layered crystal structure and the metal oxide having the rocksalt crystal structure was confirmed in the composite positive active material powders prepared in Preparation Examples 1 to 4. That is, it was also confirmed that the lithium transition metal oxide having the layered crystal structure and the metal oxide having the rocksalt crystal structure formed a composite and that regardless of the doping with Na, no impurity phase and has been produced and no significant change was made in the crystal lattice size.

Therefore, it was confirmed that Na replaced a site of Li in the layered crystal structure of the lithium transition metal oxide, and since there was little difference in the ion size between Li and Na, no change was made in the crystal lattice size, which resulted in no shifting of peaks in the XRD graph.

Evaluation Example 2: Field Emission Scanning Electron Microscopy (FESEM)

FESEM was performed on the composite positive active materials prepared in Comparative Preparation Examples 1 to 5, and images of the shape of the primary particles of the composite positive active materials were shown in FIGS. 5A to 5E, respectively.

As shown in FIGS. 5A to 5E, it was confirmed that morphology of the primary particles was not changed even if the complexation with the NiO proceeded. Accordingly, it can be inferred that morphology of the primary particles would not be changed even if the doping with Na was performed. The primary particles of the composite positive active materials had a particle diameter in a range of about 0.1 μm to about 0.3 μm.

Evaluation Example 3: Charging/Discharging Test

The coin cells prepared in Comparative Examples 1 to 5 and Examples 1 to 4 were charged at a constant current of 0.1 C until a voltage was 4.7 V (vs. Li) at a temperature of 25° C., and then, discharged at a constant current of 0.1 C until the voltage was 2.5 V (vs. Li) to perform an activation cycle ($1^{st}$ cycle).

Then, the coin cells were charged at a constant current-constant voltage of 0.5 C until a voltage was 4.6 V (vs. Li), and discharged at a constant current of 0.2 C until a voltage was 2.5 V (vs. Li) ($2^{nd}$ cycle).

The coin cells were charged at a constant current-constant voltage of 0.5 C until a voltage was 4.6 V (vs Li), and then, discharged at a constant current of 0.5 C until a voltage was 2.5 V (vs Li) ($3^{rd}$ cycle).

The coin cells were charged at a constant current-constant voltage of 0.5 C until a voltage was 4.6 V (vs Li), and then, discharged at a constant current of 1.0 C until a voltage was 2.5 V (vs Li) ($4^{th}$ cycle).

The coin cells were charged at a constant current-constant voltage of 0.5 C until a voltage was 4.6 V vs Li and discharged at a constant current of 2.0 C until a voltage was 2.5 V ($5^{th}$ cycle).

The coin cells were charged at a constant current of 1.0 C until a voltage was 4.6 V (vs Li), and then, discharged at a constant current of 1.0 C until a voltage was 2.5 V (vs Li), and this charging/discharging process was performed until $50^{th}$ cycle.

The results of charging/discharging of the coin cells prepared in Comparative Examples 1 to 5 and Examples 1 to 4 are shown in Table 1 below. An initial discharge capacity, a capacity retention rate, and a voltage drop, all shown in Table 1, are calculated by following Equations 1 to 3.

Initial discharge capacity [mAh/g]=Discharge capacity at $2^{th}$ cycle      Equation 1

Capacity retention [%]=[Discharge capacity at $50^{th}$ cycle/Discharge capacity at $1^{st}$ cycle]×100%      Equation 2

Voltage drop [mV]=[Average driving voltage at $50^{th}$ cycle during discharging process−Average driving voltage at $1^{st}$ cycle during discharging process]      Equation 3

The average actuating voltage is a discharge voltage that corresponds to 50% of the total output during discharging process.

Figure 7B:
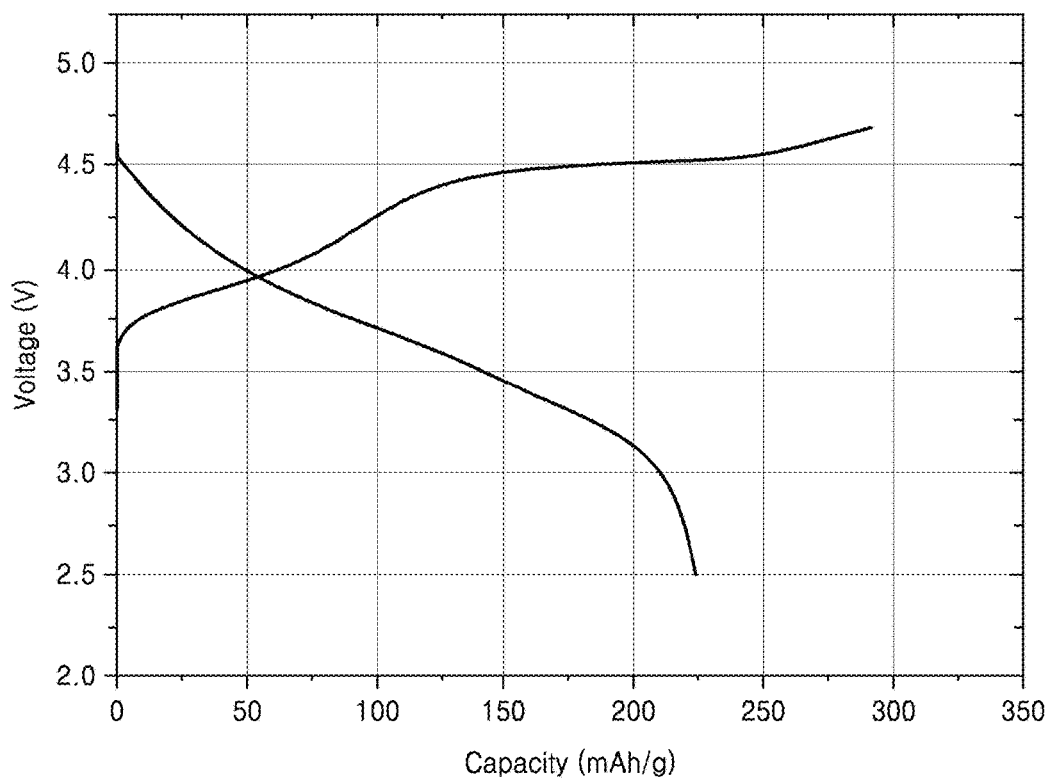
FIGS. 7A, 7B, and 7C are each a graph of voltage (V) versus capacity (mAh/g) during a $1^{st}$ cycle of charging and discharging of lithium batteries prepared in Examples 1 to 3, respectively.
Figure 7A:
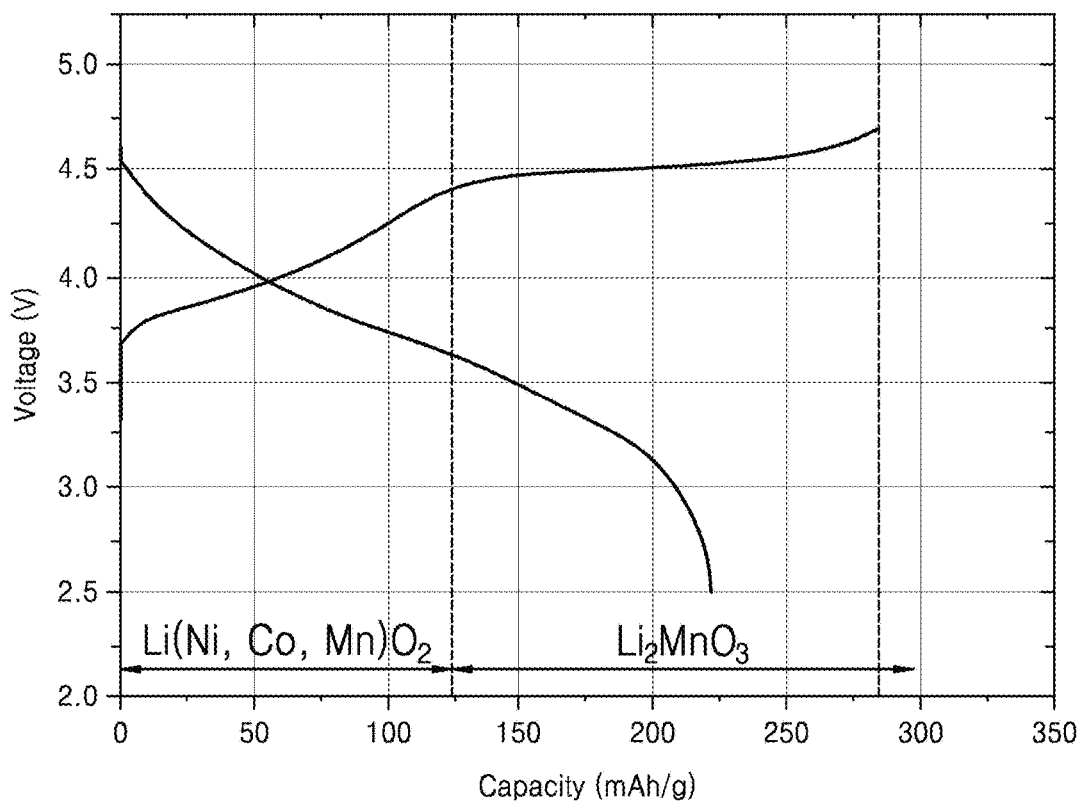
Figure 7C:
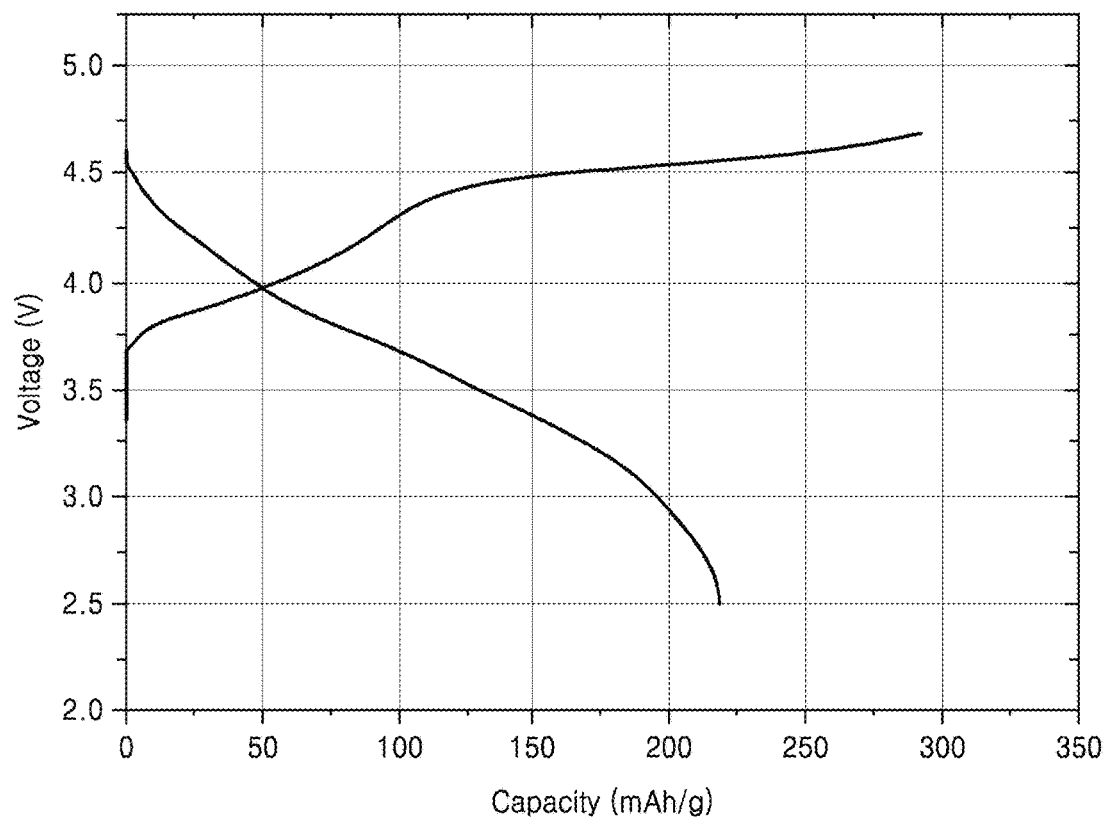

A charging/discharging profile of the first cycle of the lithium batteries prepared in Comparative Examples 2 to 5 is shown in FIGS. 6A to 6D, and a charging/discharging profile of the first cycle of the lithium batteries prepared in Examples 1 to 3 is shown in FIGS. 7A to 7C.

As shown in FIGS. 6A to 6D, plateau region was obtained at around 4.5 V, and thus activation of $Li_2MnO_3$ confirmed. That is, the presence of an overlithiated oxide (OLO) lithium transition metal oxide having a layer-layer composite crystal structure such as $Li_2MnO_3.Li(Ni,Co,Mn)O_2$ was confirmed. In addition, it was confirmed that since NiO of the rocksalt crystal structure is electrochemically inert, the capacity decreases as the content increases. In particular, the capacity in the $Li_2MnO_3$ region significantly decreases.

However, as shown in FIGS. 7A to 7C, i.e., in the case of doping with Na, the capacity decreases as the content of Na increases, but the capacity in the $Li_2MnO_3$ region increases.

TABLE 1

| | Initial discharge capacity [mAh/g] | Capacity retention [%] | Voltage drop [mV] |
|---|---|---|---|
| Comparative Example 1 | 252 | 88.4 | −75 |
| Comparative Example 2 | 239 | 91.2 | −57 |
| Comparative Example 3 | 237 | 89.7 | −72 |
| Comparative Example 4 | 229 | 90.8 | −69 |
| Comparative Example 5 | 216 | 91.9 | −56 |
| Example 1 | 206 | 90.5 | −72 |
| Example 2 | 213 | 94.4 | −56 |
| Example 3 | 207 | 93.4 | −32 |
| Example 4 | 204 | 95.2 | −4 |

As shown in Table 1, the lithium batteries prepared in Examples 1 to 4 had a high discharge capacity of 200 mAh/g or greater and improved lifespan characteristics as compared to the lithium batteries prepared in Comparative Examples 1 to 5. Particularly, voltage drop in the lithium batteries prepared in Examples 1 to 4 decreased as compared to those of the lithium batteries prepared in Comparative Examples 1 to 5.

As described above, according to the one or more of the above exemplary embodiments, a composite positive active material may have improved structural stability during charge to high-voltage. When a positive electrode including the composite positive active material is used, a lithium battery may have good lifespan characteristics and a decreased voltage drop phenomenon after a repeated charging/discharging process.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite positive active material comprising a composite, the composite comprising:
   a first metal oxide having a layered crystal structure; and
   a second metal oxide having a rocksalt crystal structure,
   wherein the second metal oxide is intermixed within the layered crystal structure of the first metal oxide, and
   wherein the composite comprises at least one doping element selected from Group 1 and Group 2 of the Periodic Table wherein the doping element is not Li.

2. The composite positive active material of claim 1, wherein the second metal oxide comprises at least one metal element selected from Group 8, Group 9, Group 10, Group 11, and Group 12 of the Periodic Table.

3. The composite positive active material of claim 2, wherein the metal element is at least one selected from Ni, Co, Mn, Fe, Cu, and Cr.

4. The composite positive active material of claim 1, wherein the second metal oxide has a composition represented by Formula 1:

$$AO \qquad \text{Formula 1}$$

wherein, in Formula 1, A is at least one metal selected from Ni, Co, Fe, Cu, Zn, Ca, Sr, Mg, and Cr.

5. The composite positive active material of claim 1, wherein an amount of the second metal oxide is from greater than 0 mole percent to about 20 mole percent, based on a total number of moles of the first metal oxide and the second metal oxide in the composite positive active material.

6. The composite positive active material of claim 1, wherein the doping element is at least one element selected from Na, K, Ca, and Ba.

7. The composite positive active material of claim 1, wherein the first metal oxide comprises lithium, and
   wherein an amount of the doping element is greater than 0 mole percent to about 20 mole percent, based on a total number of moles of Li in the first metal oxide.

8. The composite positive active material of claim 1, wherein the first metal oxide comprises the doping element.

9. The composite positive active material of claim 1, wherein the first metal oxide has a composition represented by at least one of Formulae 2 and 3:

$$[Li_{1-a}A'_a]MeO_2 \qquad \text{Formula 2}$$

wherein, in Formula 2,
   A' is at least one element selected from Group 1 and Group 2 of the Periodic Table, and is not Li,
   Me is at least one metal selected from Mn, V, Cr, Fe, Co, Ni, Zr, Re, Al, B, Ge, Ru, Sn, Ti, Nb, Mo, and Pt, and
   $0<a\leq0.2$, and $$v[Li_{2-b}A'_b][M_{1-c}A'_c]O_3 \cdot w[Li_{1-d}A'_d][Me_{1-e}A'_e]O_2 \qquad \text{Formula 3}$$

wherein, in Formula 3,
   A' is at least one element selected from Group 1 and Group 2 of the Periodic Table and is not Li,
   M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth metal,
   Me is at least one metal selected from Mn, V, Cr, Fe, Co, Ni, Zr, Re, Al, B, Ge, Ru, Sn, Ti, Nb, Mo, and Pt,
   $0<v<1$, $0<w<1$, $v+w=1$, $0\leq b<1$, $0\leq c<1$, $0\leq d<1$, $0\leq e<1$, and $0<A'/Li\leq0.2$,
   wherein A'/Li is a molar ratio of A' and Li in the composite positive active material.

10. The composite positive active material of claim 1, wherein the first metal oxide has a composition represented by Formula 2a:

$$[Li_{1-a}A'_a](Ni_pCo_qMn_r)O_2 \qquad \text{Formula 2a}$$

wherein, in Formula 2a, A' is at least one element selected from Na, K, Ca, and Ba, $0\leq p\leq1$, $0\leq q\leq1$, $0\leq r\leq1$, $p+q+r=1$, and $0<a\leq0.2$.

11. The composite positive active material of claim 1, wherein the first metal oxide has a composition represented by Formula 3a:

$$v[Li_{2-b}A'_b]_2MO_3 \cdot w[Li_{1-d}A'_d]MeO_2 \qquad \text{Formula 3a}$$

wherein, in Formula 3a,
   A' is at least one element selected from Group 1 and Group 2 of the Periodic Table and is not Li,
   M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth element,
   Me is at least one metal selected from Mn, V, Cr, Fe, Co, Ni, Zr, Re, Al, B, Ge, Ru, Sn, Ti, Nb, Mo, and Pt, $0<v<1$, $0<w<1$, $v+w=1$, $0\leq b<1$, $0\leq d<1$, and $0<A'/Li\leq 0.2$, wherein A'/Li is a molar ratio of A' and Li in the composite positive active material.

12. The composite positive active material of claim 1, wherein the first metal oxide has a composition represented by Formula 3b:

$$v[Li_{2-b}A'_b]_2MnO_3 \cdot w[Li_{1-d}A'_d](Ni_pCo_qMn_r)O_2 \qquad \text{Formula 3b}$$

wherein, in Formula 3b,

A' is at least one element selected from Na, K, Ca, and Ba, $0<v<1$, $0<w<1$, $v+w=1$, $0\leq p\leq 1$, $0\leq q\leq 1$, $0\leq r\leq 1$, $p+q+r=1$, $0\leq b<1$, and $0\leq d<1$, and $0<A'/Li\leq 0.2$, wherein A'/Li is a molar ratio of A' and Li in the composite positive active material.

13. The composite positive active material of claim 1, wherein the first metal oxide comprises a plurality of crystalline phases, and wherein the first metal oxide is a composite of the plurality of crystalline phases.

14. The composite positive active material of claim 1, wherein first metal oxide having the layered crystal structure and second metal oxide having the rocksalt structure are homogenously distributed in the composite positive active material.

15. A positive electrode comprising the composite positive active material of claim 1.

16. A lithium battery comprising the positive electrode of claim 15.

17. A composite positive active material of claim 1, comprising a composite, the composite comprising:

a first metal oxide having a layered crystal structure; and
a second metal oxide having a rocksalt crystal structure,
wherein the composite comprises at least one doping element selected from Group 1 and Group 2 of the Periodic Table wherein the doping element is not Li, and
wherein the composite positive active material has a composition represented by at least one of Formulae 4 and 5:

$$x[Li_{1-a}A'_a]MeO_2 \cdot yAO \qquad \text{Formula 4}$$

wherein, in Formula 4,

A' is at least one element selected from Group 1 and Group 2 of the Periodic Table, Me is at least one metal selected from Mn, V, Cr, Fe, Co, Ni, Zr, Re, Al, B, Ge, Ru, Sn, Ti, Nb, Mo, and Pt, A is at least one metal selected from Ni, Co, Fe, Cu, Zn, Ca, Sr, Mg, and Cr;

$0<x<1$, $0<y<0.2$, $x+y=1$, and $0<a\leq 0.2$, and $$x[Li_{2-b}A'_b][M_{1-c}A'_c]O_3 \cdot y[Li_{1-d}A'_d][Me_{1-e}A'_e]O_2 \cdot zAO \qquad \text{Formula 5}$$

wherein, in Formula 5,

A' is at least one element selected from Group 1 and Group 2 of the Periodic Table, M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth element, Me is at least one metal selected from Mn, V, Cr, Fe, Co, Ni, Zr, Re, Al, B, Ge, Ru, Sn, Ti, Nb, Mo, and Pt, A is at least one metal selected from Ni, Co, Fe, Cu, Zn, Ca, Sr, Mg, and Cr, $0<x<1$, $0<y<1$, $0<z<0.2$, $x+y+z=1$, $0\leq b<1$, $0\leq c<1$, $0\leq d<1$, $0\leq e<1$, and $0<A'/Li\leq 0.2$, wherein A'/Li is a molar ratio of A' and Li in the composite positive active material.

18. The composite positive active material of claim 17, wherein the composite positive active material has a composition represented by Formula 4a:

$$x[Li_{1-a}A'_a](Ni_pCo_qMn_r)O_2 \cdot yAO \qquad \text{Formula 4a}$$

wherein, in Formula 4a,

A' is at least one element selected from Na, K, Ca, and Ba, $0<x<1$, $0<y<0.2$, $x+y=1$, $0<a\leq 0.2$, $0\leq p\leq 1$, $0\leq q\leq 1$, $0\leq r\leq 1$, and $p+q+r=1$.

19. The composite positive active material of claim 17, wherein the composite positive active material has a composition represented by Formula 5a:

$$x[Li_{2-b}A'_b]_2MO_3 \cdot y[Li_{1-d}A'_d]MeO_2 \cdot zAO \qquad \text{Formula 5a}$$

wherein, in Formula 5a,

A' is at least one element selected from Group 1 and Group 2 of the Periodic Table and is not Li, M is at least one metal selected from Al, Ga, Ge, Mg, Nb, Zn, Cd, Ti, Co, Ni, K, Na, Ca, Si, Fe, Cu, Sn, V, B, P, Se, Bi, As, Zr, Re, Ru, Mn, Cr, Sr, Sc, Y, and a rare earth element, Me is at least one metal selected from Mn, V, Cr, Fe, Co, Ni, Zr, Re, Al, B, Ge, Ru, Sn, Ti, Nb, Mo, and Pt, A is at least one metal selected from Ni, Co, Fe, Cu, Zn, Ca, Sr, Mg, and Cr, $0<x<1$, $0<y<1$, $0<z<0.2$, $x+y+z=1$, $0\leq b<1$, $0\leq d<1$, and $0<A'/Li\leq 0.2$, wherein A'/Li is a molar ratio of A' and Li in the composite positive active material.

20. The composite positive active material of claim 17, wherein the composite positive active material has a composition represented by Formula 5b:

$$x[Li_{2-b}A'_b]_2MnO_3 \cdot y[Li_{1-d}A'_d](Ni_pCo_qMn_r)O_2 \cdot zAO \qquad \text{Formula 5b}$$

wherein, in Formula 5b,

A' is at least one element selected from Na, K, Ca, and Ba,

A is at least one metal selected from Ni, Co, Fe, Cu, Zn, Ca, Sr, Mg, and Cr, $0<x<1$, $0<y<1$, $0<z<0.2$, $x+y+z=1$, $0\leq p\leq 1$, $0\leq q\leq 1$, $0\leq r\leq 1$, $p+q+r=1$, $0\leq b<1$, $0\leq d<1$, and $0<A'/Li\leq 0.3$, wherein A'/Li is a molar ratio of A' and Li in the composite positive active material.

21. The composite positive active material of claim 17, wherein the second metal oxide is intermixed within the layered crystal structure of the first metal oxide.

* * * * *